United States Patent
Kaneko et al.

(10) Patent No.: US 6,947,072 B1
(45) Date of Patent: Sep. 20, 2005

(54) VIDEO TELECOMMUNICATION SYSTEM

(75) Inventors: Nobuyuki Kaneko, Kawasaki (JP);
Takehiko Fujiyama, Kawasaki (JP);
Youichi Ashida, Kawasaki (JP);
Toshinori Shima, Fukuoka (JP)

(73) Assignee: Fujitsu Limited, Kawasaki (KR)

( * ) Notice: Subject to any disclaimer, the term of this patent is extended or adjusted under 35 U.S.C. 154(b) by 0 days.

(21) Appl. No.: 09/506,534

(22) Filed: Feb. 17, 2000

(30) Foreign Application Priority Data

Feb. 19, 1999 (JP) .................................. 11-041910

(51) Int. Cl.[7] ............................................ H04N 7/18
(52) U.S. Cl. ...................... 348/149; 348/143; 348/159
(58) Field of Search ................................ 348/149, 143, 348/159, 14.07, 14.09, 14.15, 401; 715/500.1; 725/74

(56) References Cited

U.S. PATENT DOCUMENTS

| | | | | |
|---|---|---|---|---|
| 4,965,819 A | * | 10/1990 | Kannes | ..................... 348/14.07 |
| 4,977,449 A | * | 12/1990 | Morgan | ......................... 725/74 |
| 5,264,929 A | * | 11/1993 | Yamaguchi | ................. 348/159 |
| 5,347,306 A | * | 9/1994 | Nitta | ......................... 348/14.1 |
| 5,382,972 A | * | 1/1995 | Kannes | ..................... 348/14.07 |
| 5,508,737 A | * | 4/1996 | Lang | ........................... 348/159 |
| 5,541,640 A | * | 7/1996 | Larson | .................... 348/14.15 |
| 5,710,591 A | * | 1/1998 | Bruno et al. | ............. 348/14.09 |
| 5,734,923 A | * | 3/1998 | Sagawa et al. | .......... 715/500.1 |

FOREIGN PATENT DOCUMENTS

EP 0 493 262 A2 * 7/1992 ............ H04N 7/18
JP 8-79624 3/1996

* cited by examiner

Primary Examiner—Allen Wong
(74) Attorney, Agent, or Firm—Katten Muchin Rosenman LLP

(57) ABSTRACT

A video telecommunication system having a plurality of cameras (video cameras) installed at remote locations and a monitor for monitoring the video, provided with a video information describing unit for sending a switch command for the camera to a video transmission apparatus, simultaneously sending character information describing the video information of the camera in accordance with the switch command, and having the video information and the character information displayed on the monitor, whereby it is possible to easily record, change, and correct character information on the place name etc. combined with the video information.

22 Claims, 30 Drawing Sheets

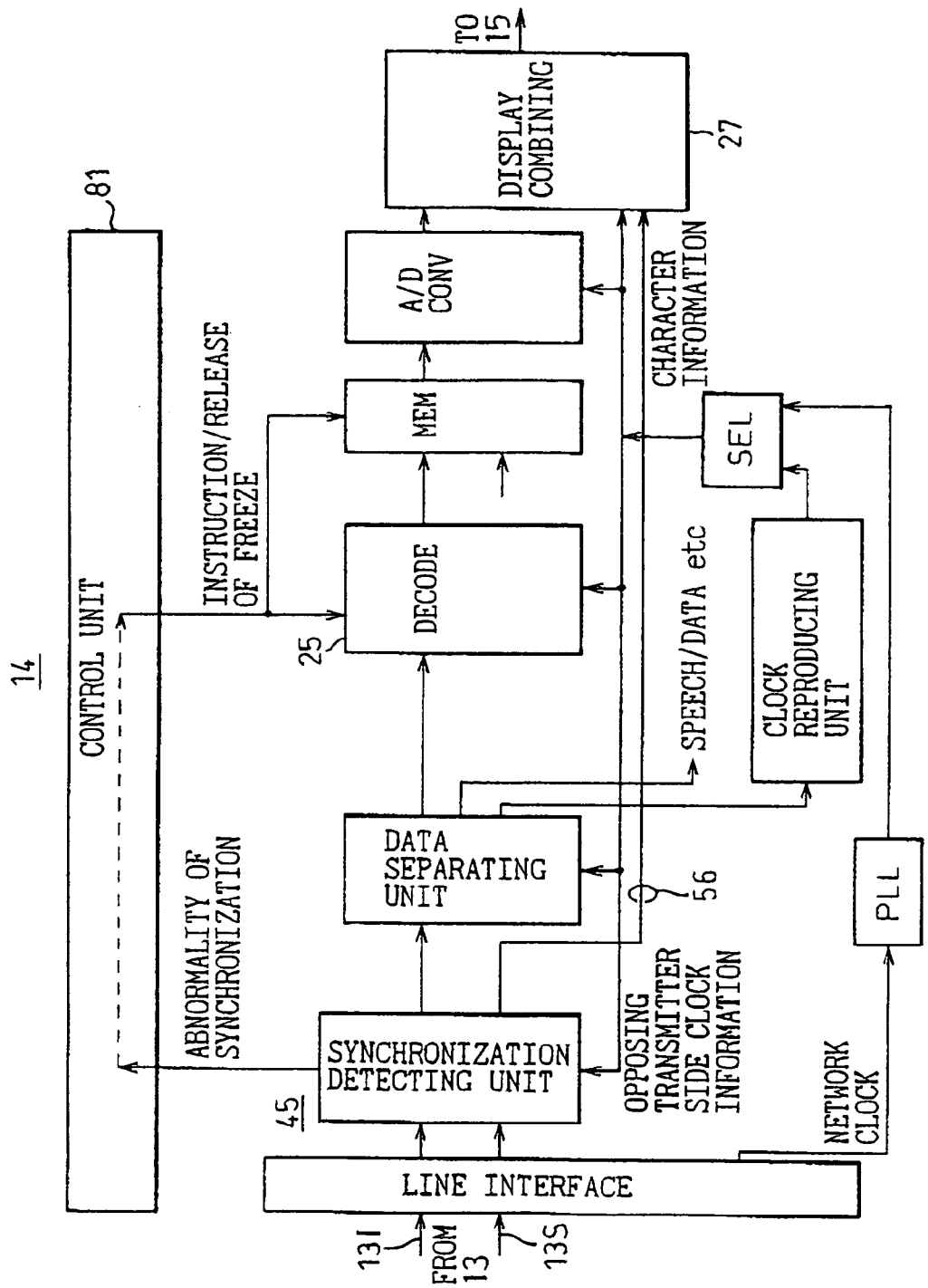

VIDEO TELECOMMUNICATION SYSTEM

BACKGROUND OF THE INVENTION

1. Field of the Invention

The present invention relates to a video telecommunication system provided with a plurality of cameras installed at a transmission side, at least one monitor provided at a reception side, and a network for transferring the video information data from the cameras to the monitor and also relates to a video transmission apparatus and a video reception apparatus used for such a video telecommunication system.

Wide use is now becoming made of the above video telecommunication systems for example for remote monitoring of traffic conditions at multiple locations of highways and remote monitoring of the environment at multiple locations near dams and their reservoirs. The advances made in large-capacity data transmission technology using dedicated optical fibers has contributed much to this.

2. Description of the Related Art

In such a video telecommunication system, when viewing a video from a transmission side camera (video camera) displayed at the output part of a video receiver apparatus provided in for example a supervisory center, that is, the above monitor, the most important information together with the video information is the information on the name of the location, that is, the place the camera is now shooting. In the case of the example of monitoring the area around a dam and its reservoir, specific examples of the information on the place names are a "Bridge A", "Road B", "River C", "valley D", "Mountain E", etc.

The information on such place names conventionally is recorded by an operator going out to the video transmission apparatus (field) working with the cameras.

When it was necessary to change a once recorded place name or when it is learned that there was an error in a once recorded place name and it has to be corrected, in the past an operator went out to the video transmission apparatus to make the change or correction.

Further, in the related art, the working conditions of the cameras placed in the field were monitored using a dedicated monitoring terminal provided in the supervisory center.

Summarizing the problems to be solved by the invention, in the above video telecommunication system of the related art, a large number of steps were involved in recording the above place name information. Therefore, there was the problem that the larger the number of places covered or the further away the places, the huger the number of steps required for recording the place names.

Further, there was the problem that when a need arose for changing or correcting a place name, the operation for that purpose ended up requiring a long time. Therefore, the interruption until the video from the cameras could be monitored normally once again ended up becoming longer.

Still further, if viewing the monitoring of the working conditions of the cameras, since the dedicated monitoring terminal and monitor were provided separately, there was a lack of full coordination between the two and consequently there was the problem that the inspection at the camera installation side (transmission side) could not be performed efficiently.

SUMMARY OF THE INVENTION

An object of the present invention is to provide a video telecommunication system which enables a place name to be recorded or changed or corrected easily and in a short time and which enables inspection of the camera side (transmission side) to be performed efficiently from the center side (receiving side) and to a video transmission apparatus and a video reception apparatus used for such a video telecommunication system.

To attain the above object, the present invention provides a video telecommunication system having a video information describing means for sending a camera switch command to a video transmission apparatus, simultaneously sending character information describing the video information of a camera in accordance with the switch command, and having the video information and the character information displayed on a monitor. By this, it is possible to provide a video telecommunication system having a plurality of cameras (video cameras) installed at remote locations and a monitor for monitoring the video, which system can easily record, change, and correct character information on the place name etc. to be combined with the video information.

BRIEF DESCRIPTION OF THE DRAWINGS

The above object and features of the present invention will be more apparent from the following description of the preferred embodiments given with reference to the accompanying drawings, wherein:

FIG. 31 is a block diagram of a circuit of a detailed example of the video reception apparatus shown in FIG. 17.

DESCRIPTION OF THE PREFERRED EMBODIMENTS

Preferred embodiments of the present invention will be described in detail below while referring to the attached figures.

Figure 1:
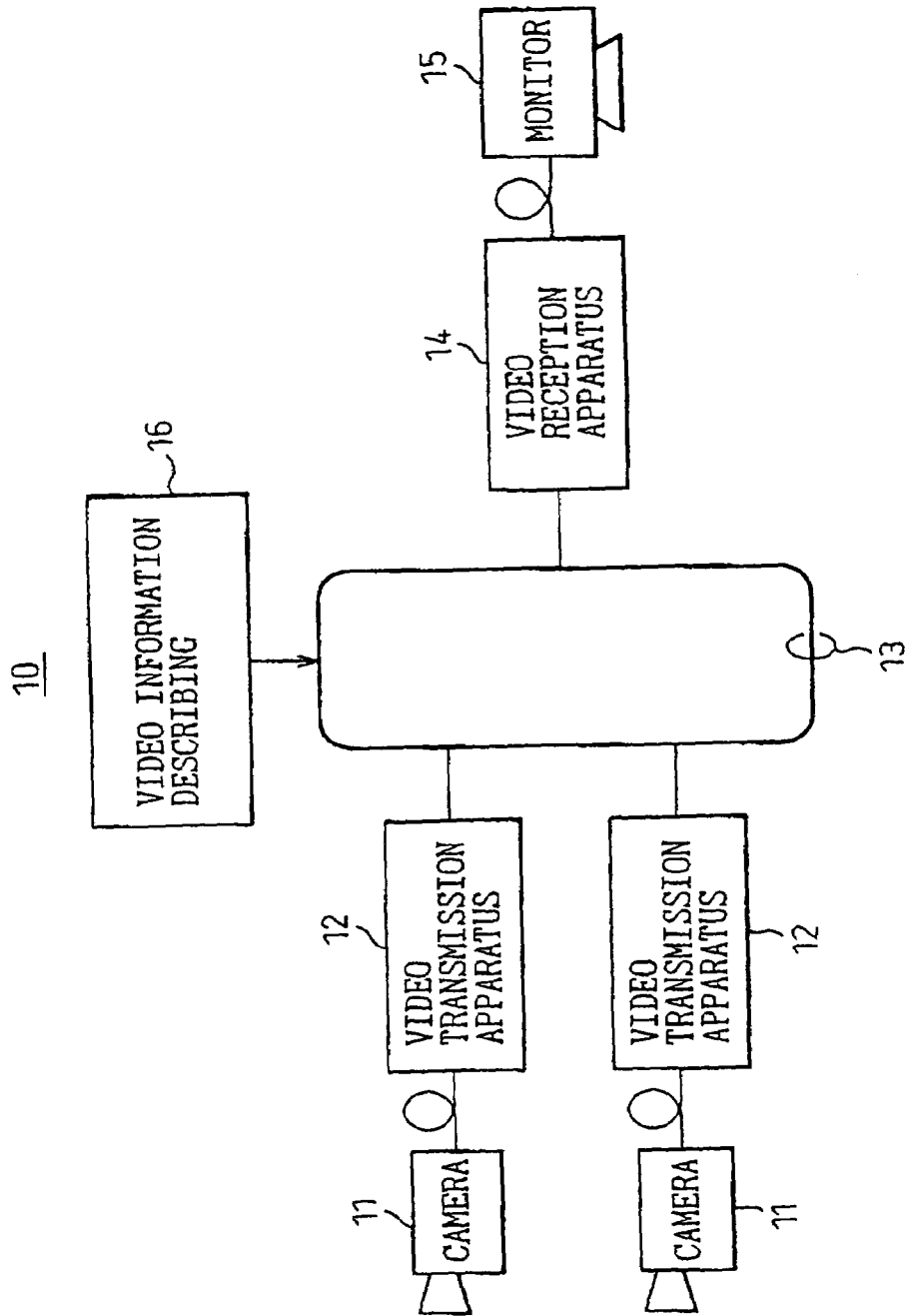
FIG. 1 is a view of the basic configuration of a video telecommunication system according to the present invention.

FIG. 1 is a view of the basic configuration of a video telecommunication system according to the present invention.

In the figure, reference numeral 10 shows a video telecommunication system. The video telecommunication system 10 has video transmission apparatuses 12 provided with cameras 11, a video reception apparatus 14 provided with a monitor 15 for receiving and displaying the video information sent from the cameras 11, and a network 13 over which the video transmission apparatuses 12 and the video reception apparatus 14 are connected.

The present invention is characterized in the provision of a video information describing means 16 in the system 10. This video information describing means 16 sends a switch command for a camera 11 to a video transmission apparatus 12, simultaneously sends character information for describing the video information of the camera 11 in accordance with the switch command, and makes the monitor 15 display the video information and the character information.

Here, the "switch command for a camera 11" means, first, to switch from one camera to another camera and, second, to change the angle of a camera to switch the place shot.

Further, the "character information for describing the video information" means, in addition to the already exemplified "Bridge A", "Road B", "River C", etc., character information such as the number (No.) of the camera shooting a scene being monitored or an angle of a camera (0 degree, 90 degrees, etc.)

By providing a video information describing means 16 in this way, it is possible to record, change, and correct character information from a single location (if necessary, several locations) commonly for all cameras.

Figure 2:
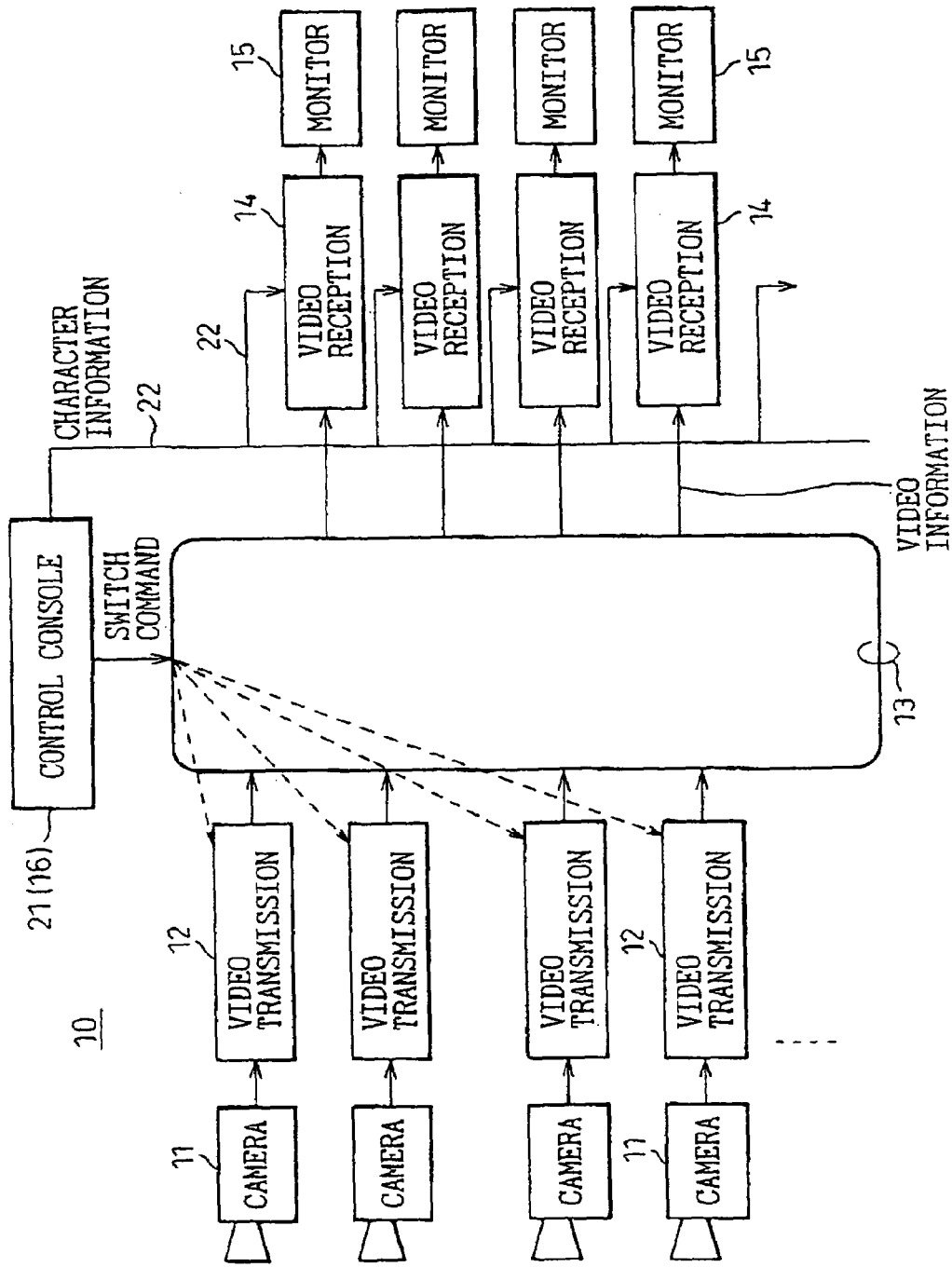
FIG. 2 is a view of a first embodiment according to the present invention.

FIG. 2 is a view of a first embodiment according to the present invention. Note that throughout the figures, the same components are shown with the same reference numerals or symbols.

In FIG. 2, the above-mentioned video information describing means 16 is shown as a control console 21. The control console (video information describing means) 21 sends the above-mentioned switch command through the network 13 to the video transmission apparatuses 12, while sends the character information through control lines 22 to the video reception apparatuses 14. Therefore, the switched video information and character information are displayed on the monitors 15. Note that an example of a configuration provided with a plurality of pairs of video reception apparatuses 14 and monitors 15 is shown at the receiving side, but a single pair is also possible as shown in FIG. 1.

Figure 3:
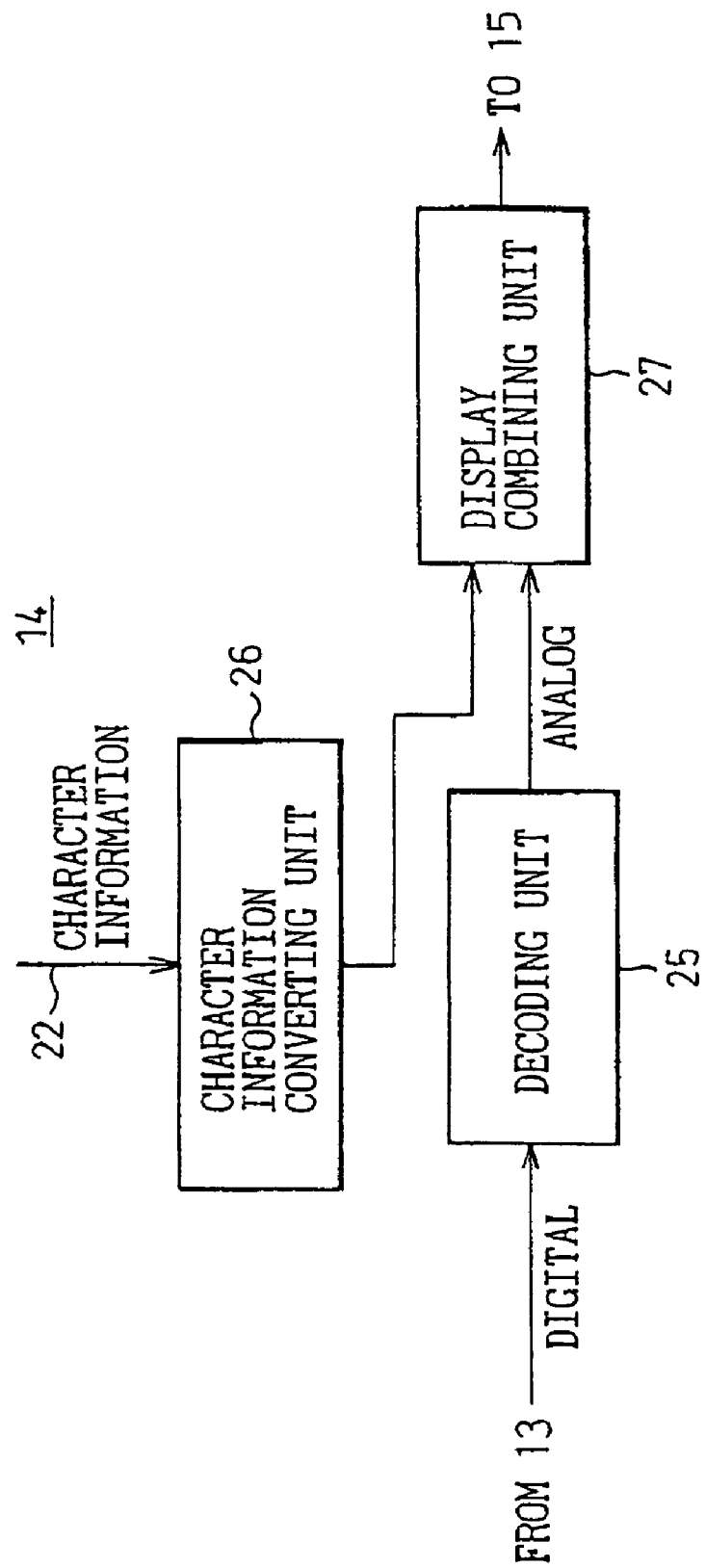
FIG. 3 is a view of a specific example of a video reception apparatus in FIG. 2.

FIG. 3 is a view of a specific example of a video reception apparatus in FIG. 2. The apparatus 14 in the figure is a video reception apparatus used in a video telecommunication system 10 having cameras 11, a monitor 15 for receiving and displaying the video information sent from the cameras 11, and a network linking the cameras 11 and the monitor 15 as shown in FIG. 1 and the apparatus 14 includes a decoding unit 25, character information converting unit 26, and display combining unit 27.

The decoding unit 25 converts the video information sent from a camera 11 to analog video information.

The control console (video information describing means) 16 sends a switch command for a camera 11, simultaneously sends character information for describing the video information from the camera 11 in accordance with that switch command, and the character information converting unit 26 receives the character information from the console 16 able to display the video information and character information on a monitor, and converts the digital code forming the character information to character information.

The display combining unit 27 combines the character information from the character information converting unit 26 and the video information from the decoding unit 25 and outputs the result to a monitor 15.

Figure 4:
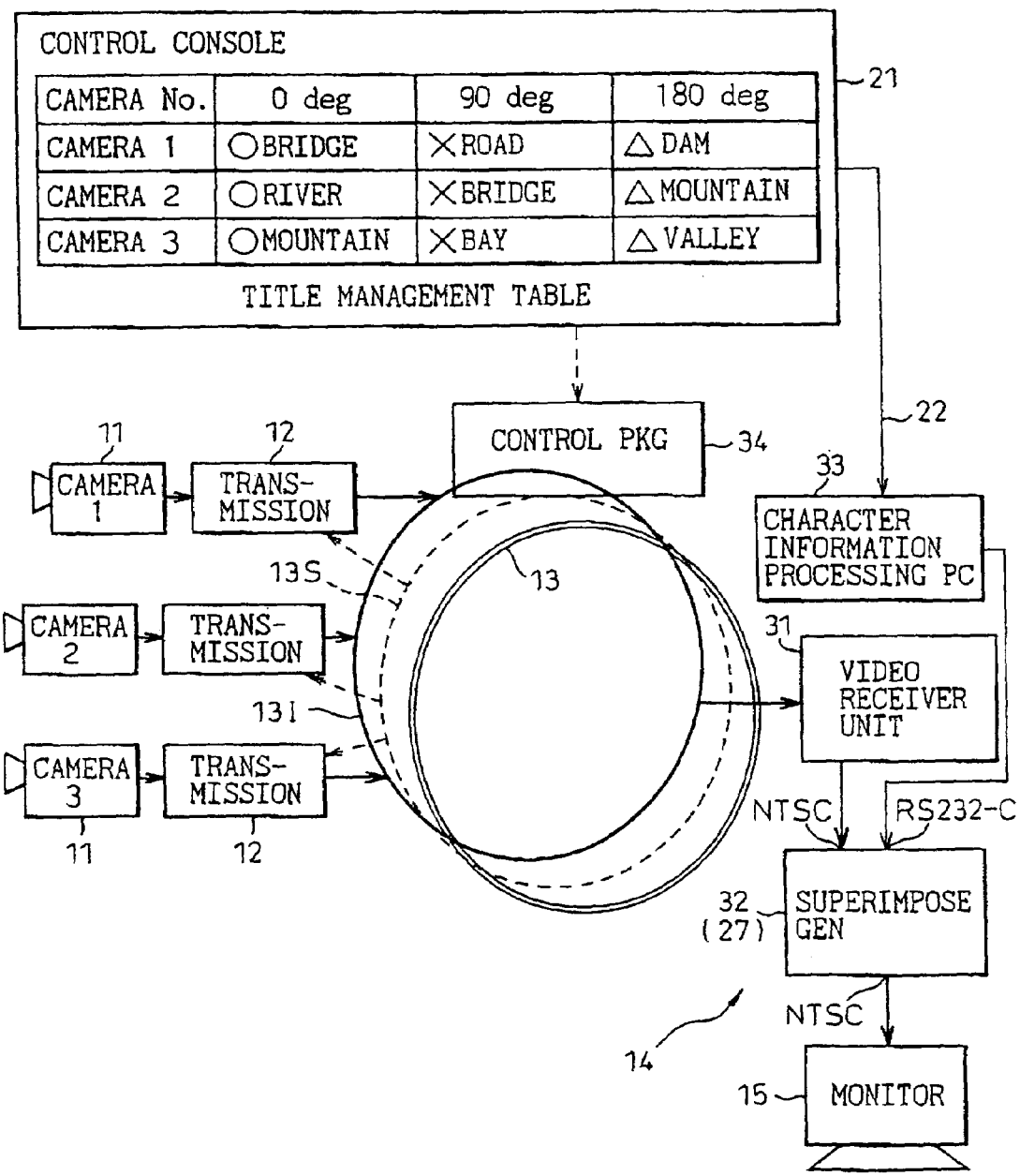
FIG. 4 is a view of the configuration shown in FIG. 2 and FIG. 3 shown by another form of expression.

FIG. 4 is a view of the configuration shown in FIG. 2 and FIG. 3 using a different form of expression. First, the control console 21 shown in FIG. 2 will be shown concretely. The main part inside it is a title management table. The table is broken down by the camera numbers (Nos.) and the camera angles. The names (titles) of the bridges, rivers, mountains, etc. are entered into it in advance. The character information is recorded, changed, and corrected here.

When the operator of the control console 21 inputs a switch command, the switch command is sent through a control package (PKG) 34 and the network 13 (including a video path 13I and a switch control path 13S) to the cameras 11. Receiving the switch command, the cameras 11 start shooting and start sending the video information to video receiver units 31 of the video reception apparatuses 14. A receiver unit 31 includes the decoding unit 25 of FIG. 3.

At the same time, the switched title and other character information are input through a control line 22 to a character information processing PC (personal computer) 33. The PC 33 functions as the character information converting unit 26 of FIG. 3.

The thus received video information and character information are input to a superimpose generator (GEN) 32 to form the integral combined data which is further output and displayed on the monitor 15. Here the superimpose generator (GEN) 32 forms the display combining unit 27 of FIG. 3. Note that the superimpose generator (GEN) 32 will be explained later.

Figure 5:
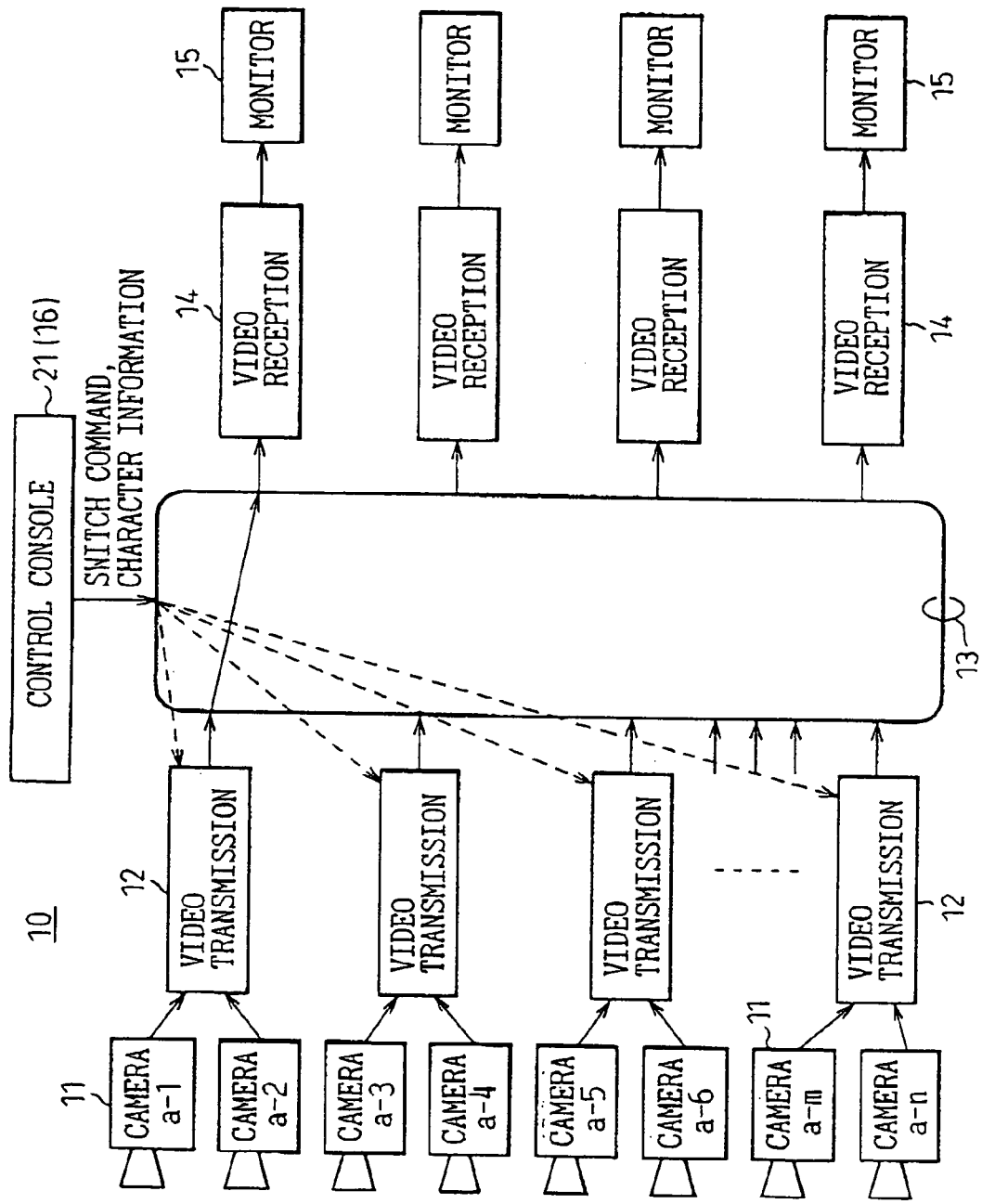
FIG. 5 is a view of a second embodiment according to the present invention.

FIG. 5 is a view of a second embodiment according to the present invention. The difference from the above first embodiment is that the control console (video information describing means) 21 in the second embodiment sends the switch command and the character information together through the network 13 to the video transmission apparatus 12. The apparatus 12 extracts the character information therefrom and multiplexes the extracted character information and the video information and sends the result to the video reception apparatus 14.

In the same way as the case of the first embodiment, a plurality of logical channels are formed on the network 13. Each of the video reception apparatuses 14 uses one logical channel (time slot) assigned to it. On the other hand, the video transmission apparatuses 12 make common use of the plurality of logical channels and can freely distribute the video information to the desired logical channels. Which logical channel to use, however, is instructed by the control console 21.

Figure 6:
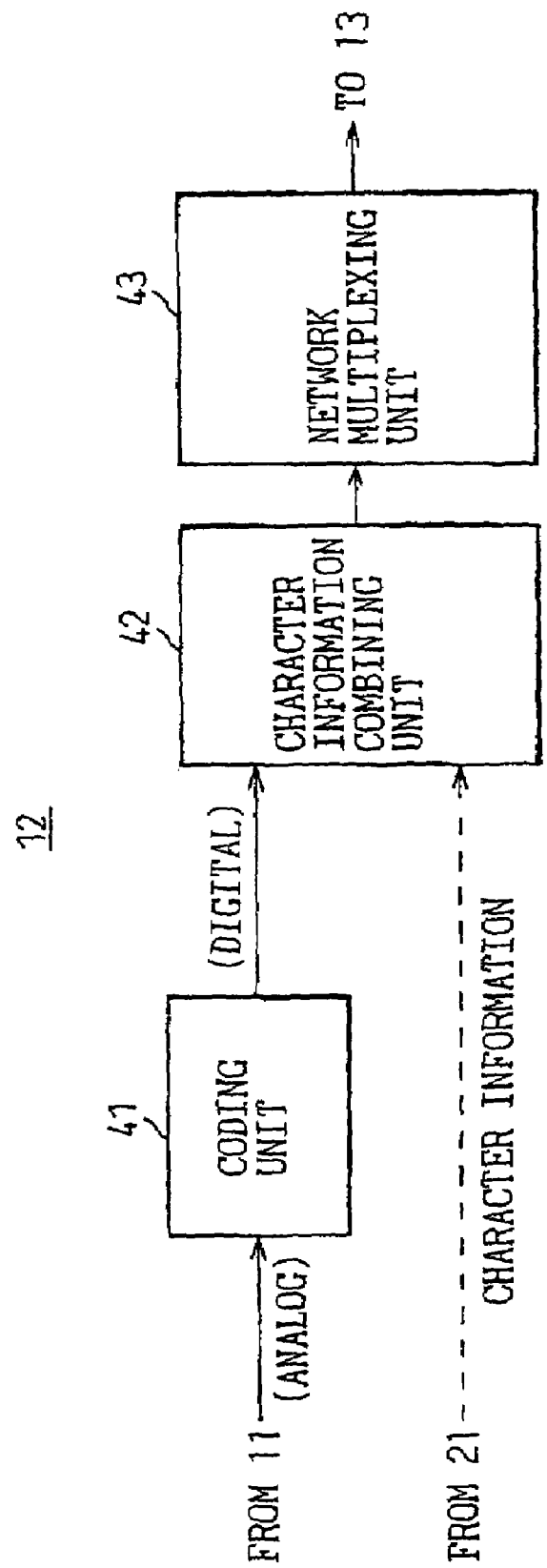
FIG. 6 is a view of a specific example of a video transmission apparatus in FIG. 5.

FIG. 6 is a view of a specific example of the video transmission apparatus 12 in FIG. 5. The apparatus 12 in the figure is a video transmission apparatus used in a video telecommunication system 10 having a camera 11, a monitor 15 receiving and displaying the video information sent from the camera 11, and a network 13 linking the camera 11 and the monitor 15. The apparatus 12 has as its characterizing feature the character information combining unit 42. This combining unit 42 sends character information as well as a switch command for the camera 11, receives the switch command and character information from the control console (video information describing means) 21 able to display the video information and character information on the monitor 15, combines the character information extracted from the received information with the video information from the camera 11, and outputs the result to the monitor 15.

The coding unit 41 converts the analog video information from the camera 11 to digital video information. Further, the network multiplexing unit 43 inserts the signal from the combining unit 42 combining the digital video information and the digital character information sent from the control console 21 into a predetermined logical channel on the network 13.

Figure 7:
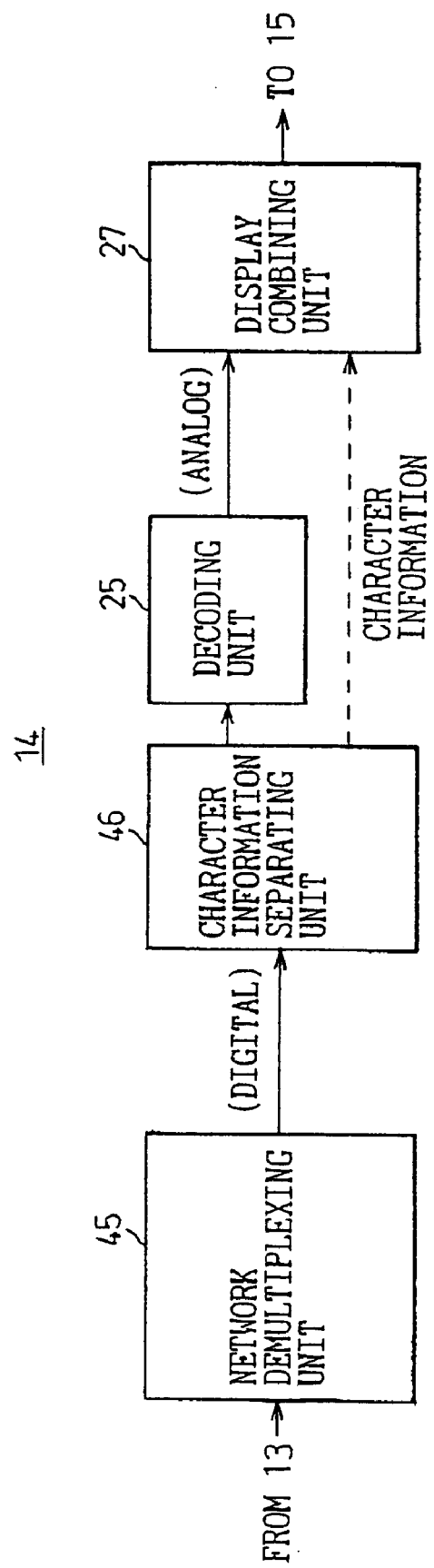
FIG. 7 is a view of a specific example of a video reception apparatus in FIG. 5.

FIG. 7 is a view of a specific example of a video reception apparatus in FIG. 5. The main part of the apparatus 14 in the figure is the character information separating unit 46. Note that the decoding unit 25 and the display combining unit 27 are as already discussed.

The character information from the control console (video information describing means) 21 which sends the character information together with the switch command for the camera 11 and can display the video information and character information on the monitor 15 is received once at the camera 11 side. The character information separating unit 46 receives the video information and the character information together as one unit from the camera 11 side, then separates the character information from the received information.

The decoding unit 25 converts the received video information to analog video information. The display combining unit 27 combines the character information from the character information separating unit 46 with the video information from the decoding unit 25 and outputs the result to the monitor 15 side.

Note that the network demultiplexing unit 45 demultiplexes and takes out the data in the logical channel assigned to that video reception apparatus 14 from the plurality of logical channels on the network 13.

Figure 8:
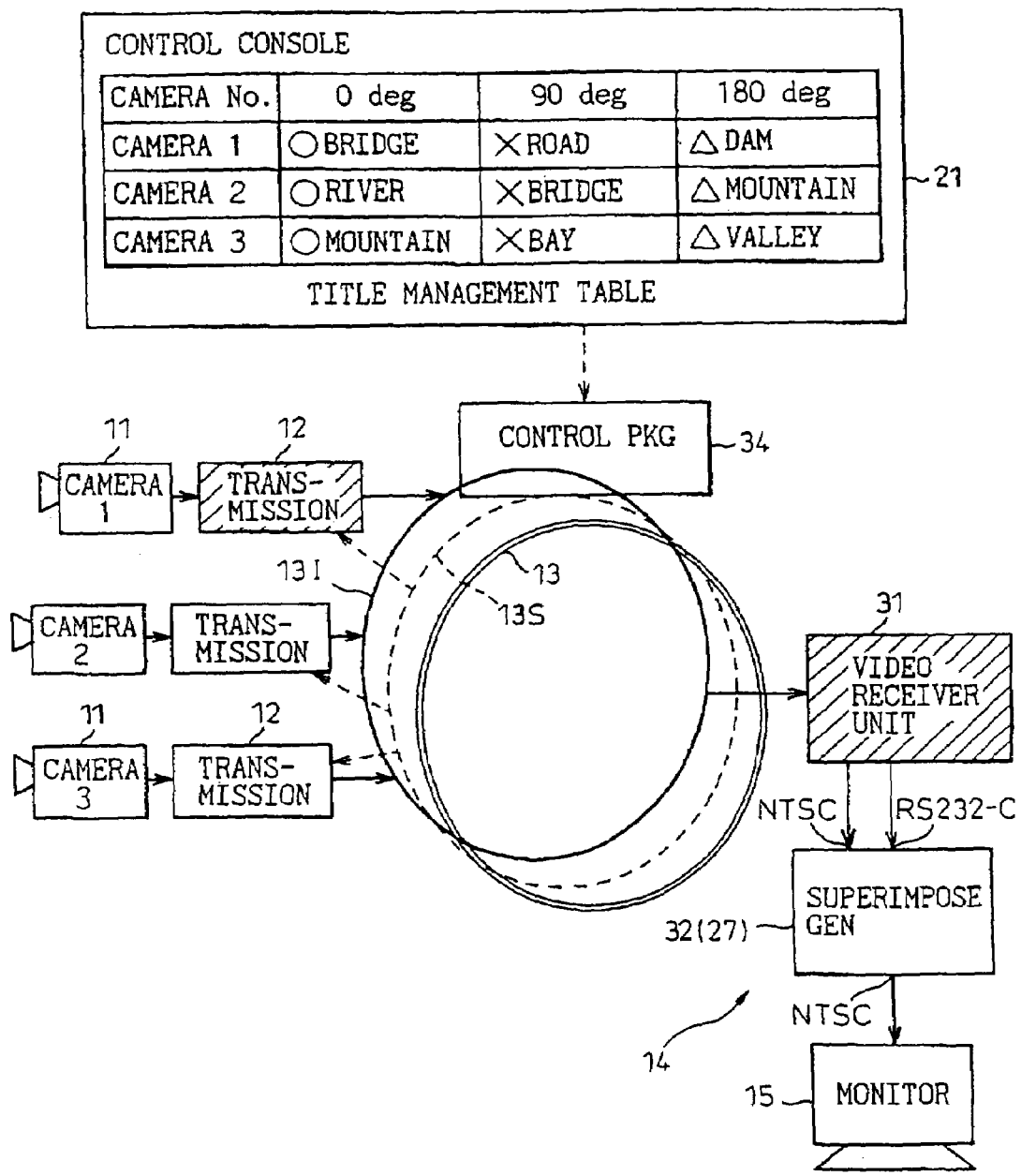
FIG. 8 is a view of the configuration shown in FIG. 5 to FIG. 7 shown by another form of expression.

FIG. 8 is a view of the configuration shown in FIG. 5 to FIG. 7 given by a different form of expression and corresponds to FIG. 4 in the case of the first embodiment.

The control lines 22 in the case of the first embodiment (FIG. 4) are not used. All of the information is sent and received over the network 13. Further, the video receiver unit 31 of the figure outputs both the video information and the character information and inputs them to the superimpose generator (GEN) 32. The video information signal is transferred via a general television use NTSC terminal, while the character information signal is transferred via a general RS232-C terminal.

Figure 9:
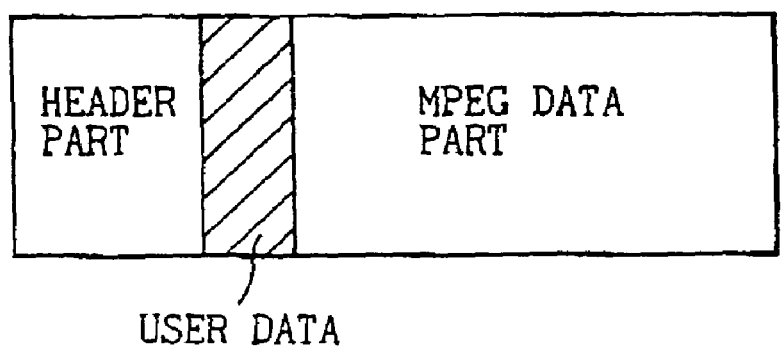
FIG. 9 is a view of a first example of a data format of a signal sent to a network.

FIG. 9 is a view of a first example of the data format of a signal sent over the network 13.

Figure 10:
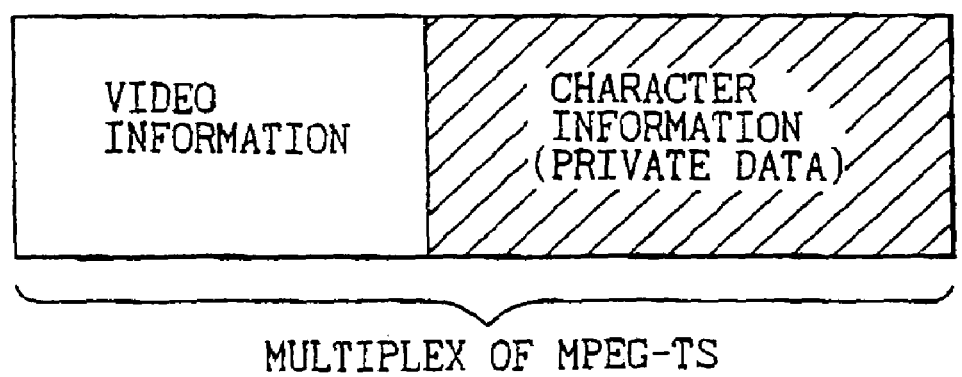
FIG. 10 is a view of a second example of a data format of a signal sent to a network.

FIG. 10 is a view of a second example of the data format of a signal sent over the network 13.

The above-mentioned character information combining unit 42 (FIG. 6) inserts the combined video information and character information, as shown in FIG. 9 and FIG. 10, in a data frame DF and outputs the same to the monitor 15 side.

In the case of FIG. 9, the data frame DF is a data frame formed based on the MPEG and holds the video information and the character information in a user data region.

Further, in the case of FIG. 10, the data frame DF is a data frame formed based on the MPEG and holds the character information in a private data region.

The user data region and the private data region are both data regions opened to the user. Since the video information and the character information are sent simultaneously in this way, the display of the video information and the display of the character information on the monitor 15 are simultaneous. There is never any deviation in timing between the two displays. Therefore, the operator viewing the monitor 15 never feels there is anything strange.

The user data is present in the MPEG-TS (FIG. 10). In more detail, it is present in the coded video data. Therefore, the character information is set in the user data. In this case, there is no need to alter the timing of setting the character information in the MPEG2 data or the portion (processing part) of setting.

Figure 11:
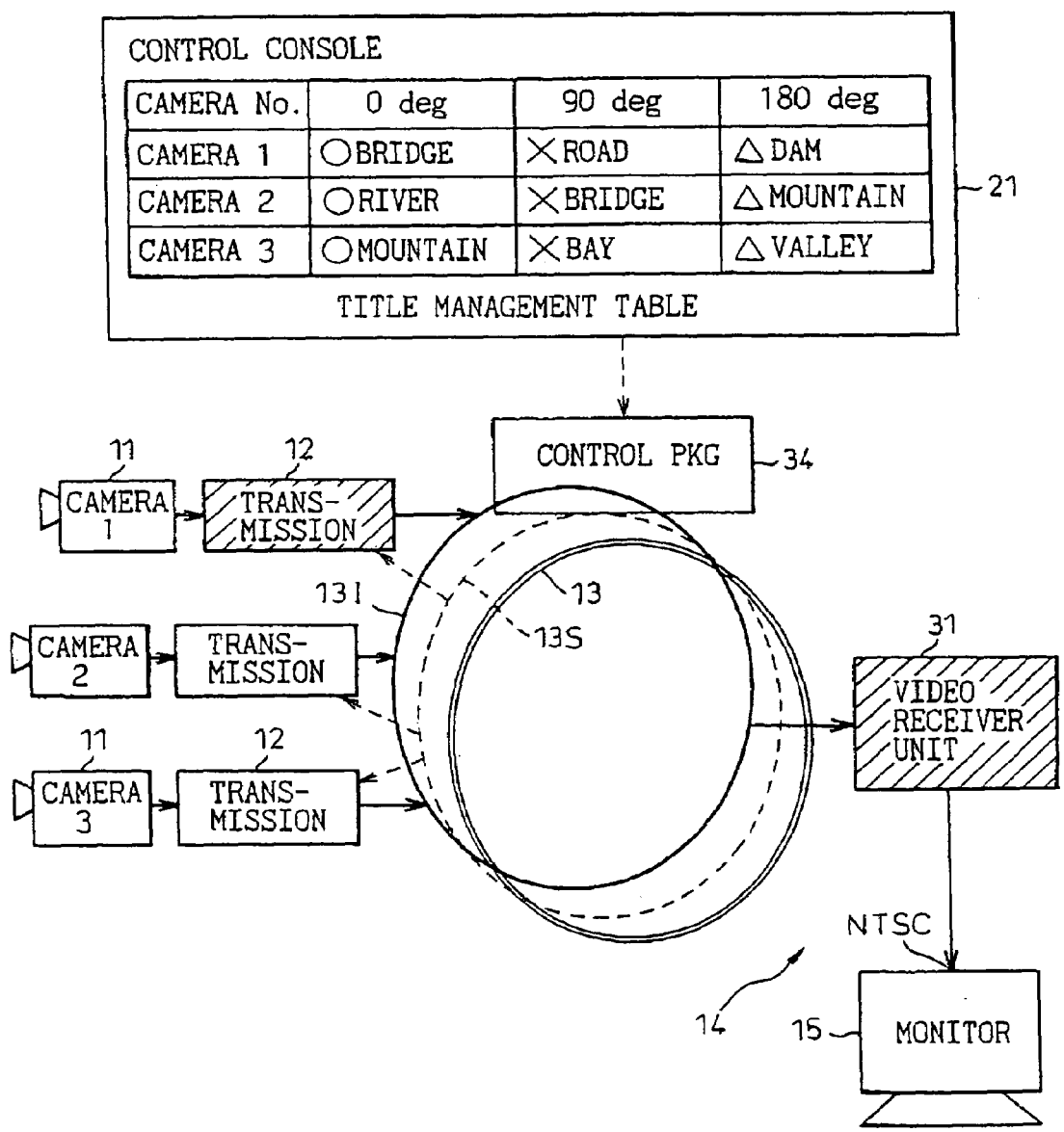
FIG. 11 is a view of the configuration of a video reception apparatus in the case of use of a data frame of FIG. 9.

The video receiver unit converts the character information taken out from the user data to CCD (closed caption data) information of the NTSC signal to give the configuration such as in FIG. 11 at the video receiving side. In this case, the display combining unit 27 in FIG. 13, which is explained later, is present in the video receiver unit 31 in FIG. 11. The character information is set in the CCD information of the NTSC signal output from the video receiver unit 31. By connecting the receiver unit 31 to a monitor with a built-in closed caption function, the character information is displayed automatically overlaid. Note that the conversion from user data to CCD information is by a mechanism enabling complete synchronization by the U.S. ATV system. As a monitor with a built-in closed caption function, for example there are the Sony monitors PVM2054T and PVM1454T and the Hitachi video VT-F51PC (98.000).

FIG. 11 is a view of the configuration of a video reception apparatus in the case of use of the data frame of FIG. 9. There is no superimpose generator GEN. The video receiver unit 31 is directly coupled with the monitor 15.

Next, an explanation will be given of a third embodiment according to the present invention. The overall view of the system is the same as that of the configuration shown in FIG. 5 (second embodiment).

The third embodiment is preferably used for the case of use of the data frame DF of the format shown in the above FIG. 10.

In the data frame DF of the format shown in FIG. 9 (using user data), the character information is completely overlaid on the video information, but in the data frame DF of the format shown in FIG. 10 (using private data), the unity of the video information and the character information is not guaranteed. The third embodiment is effect for the case where unity is desired to be guaranteed.

Figure 12:
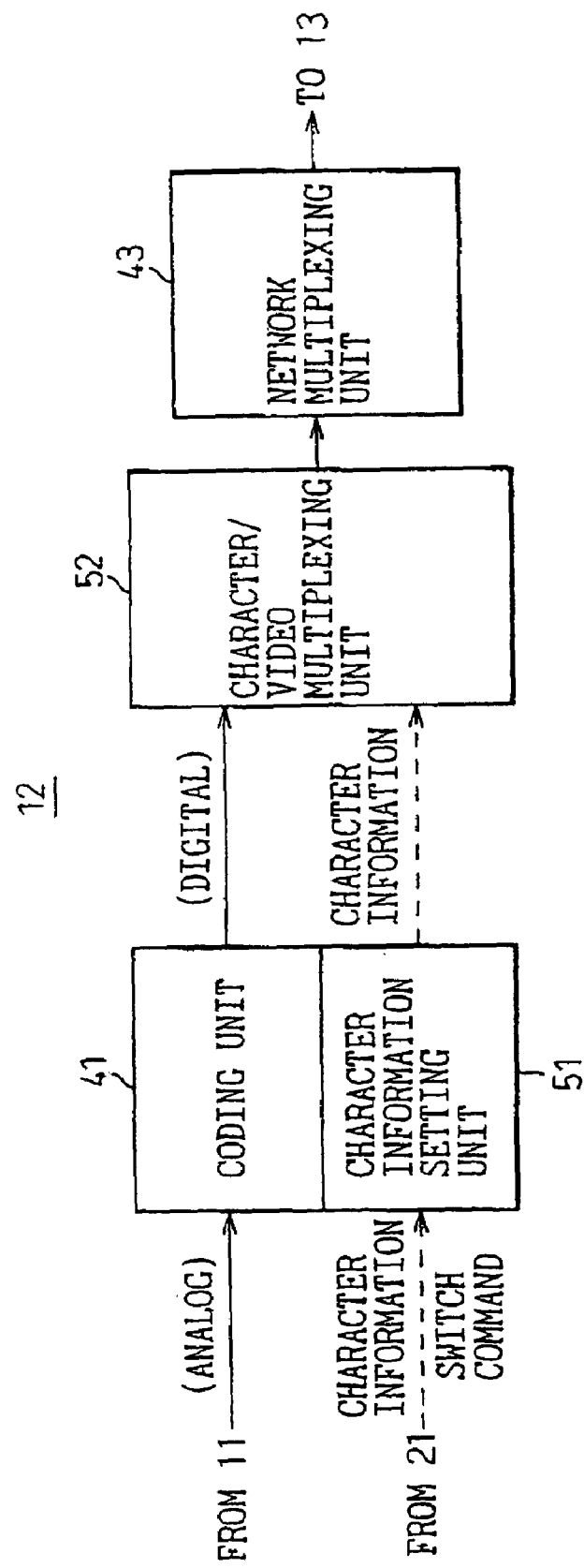
FIG. 12 is a view of a specific example of a video transmission apparatus in a third embodiment.

FIG. 12 is a view of a specific example of the video transmission apparatus in the third embodiment. In the figure, a character information setting unit 51 and a character/video multiplexing unit 52 are newly introduced components. The character/video multiplexing unit 52, together with the character information setting unit 51, forms the data frame DF of the format shown in FIG. 10 and sends it via the network multiplexing unit 43 to the network 13. Here, the character information setting unit 51 inputs just the character information to the multiplexing unit 52 in synchronization so that the switched video information and character information come together.

Figure 13:
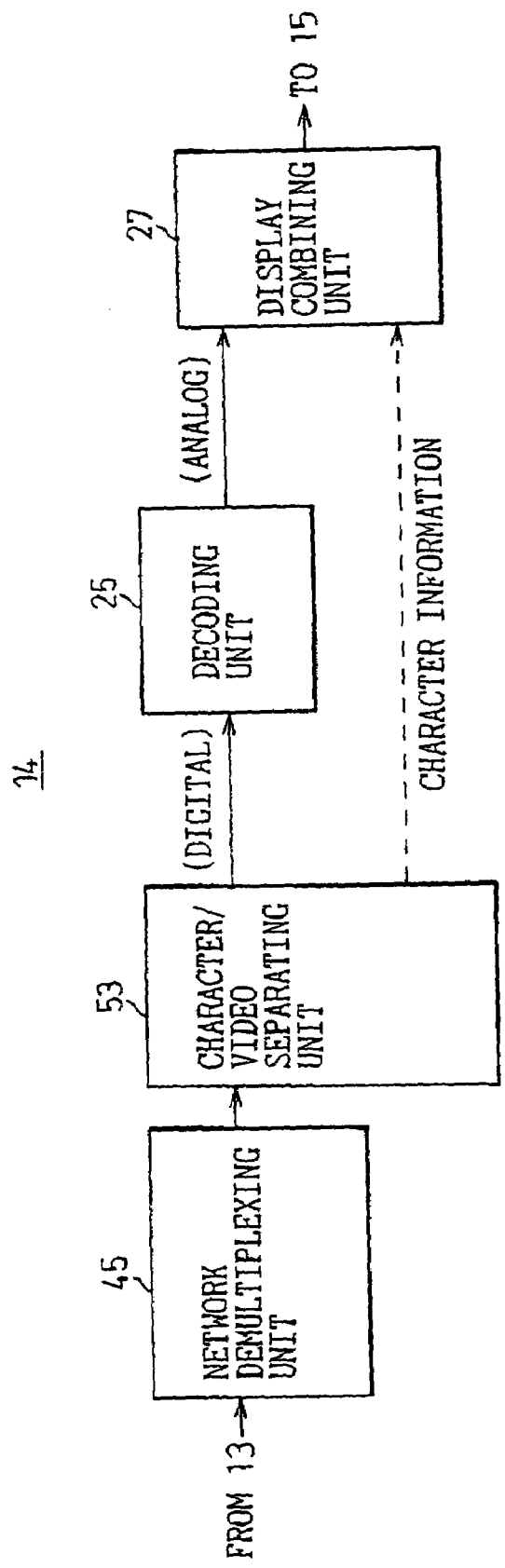
FIG. 13 is a view of a specific example of a video reception apparatus in the third embodiment.

FIG. 13 is a view of a specific example of the video reception apparatus in the third embodiment. In the figure, a character/video separating unit 53 is a newly introduced component.

The character/video separating unit 53 separates the character information from the private data portion. The separated character information is input to the display combining unit 27 together with the video information converted to an analog signal at the decoding unit 25.

Figure 14:
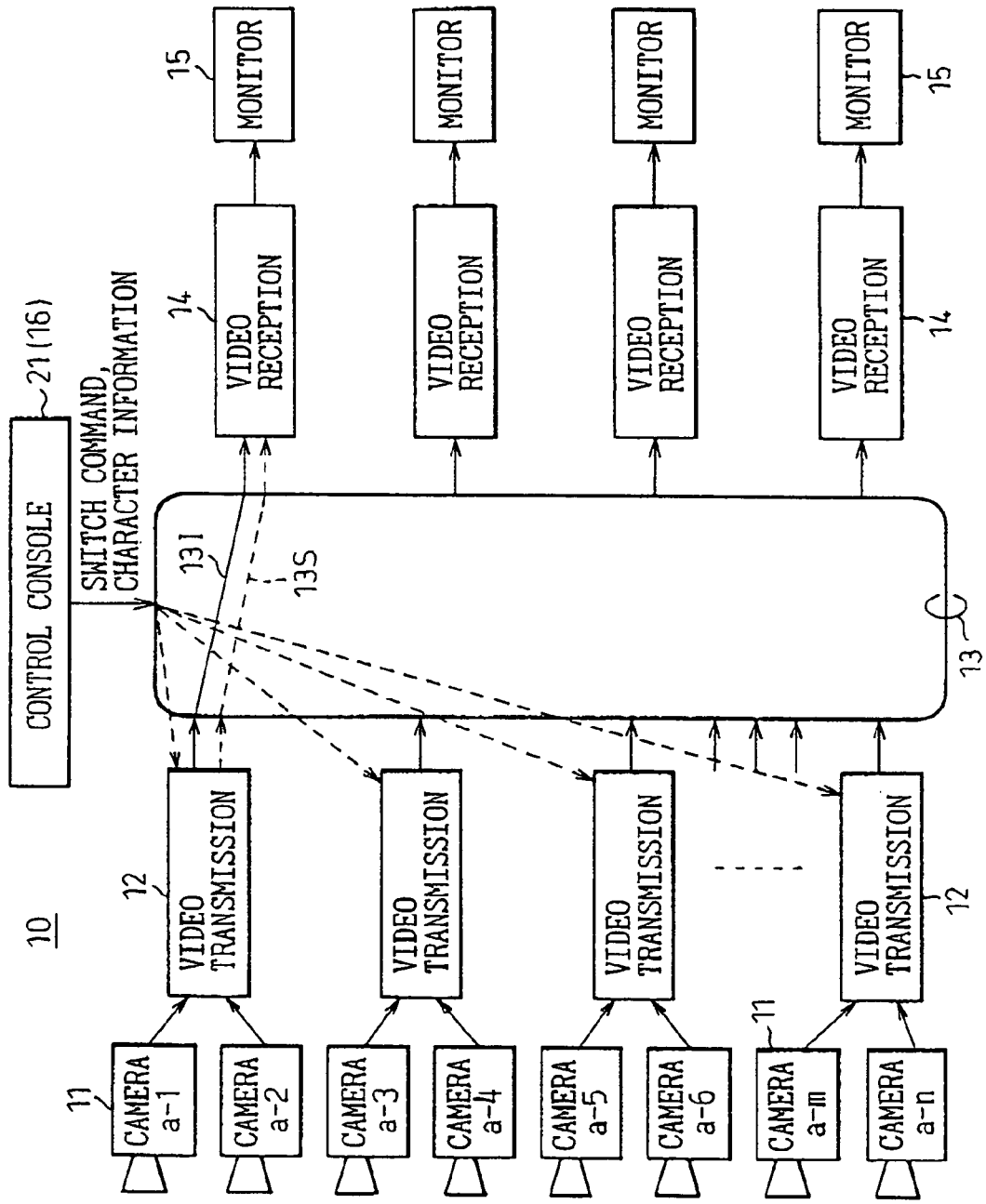
FIG. 14 is a view of a fourth embodiment according to the present invention.

FIG. 14 is a view of a fourth embodiment according to the present invention. The fourth embodiment has as its characterizing feature the connection of a video transmission apparatus 12 and the corresponding video reception apparatus 14 not only by the video path 131 on the network 13, but also the switch control path 13S. That is, by using the switch control path 13S, the video information and the character information are transmitted separately and independently from each other without being combined or multiplexed.

Figure 15:
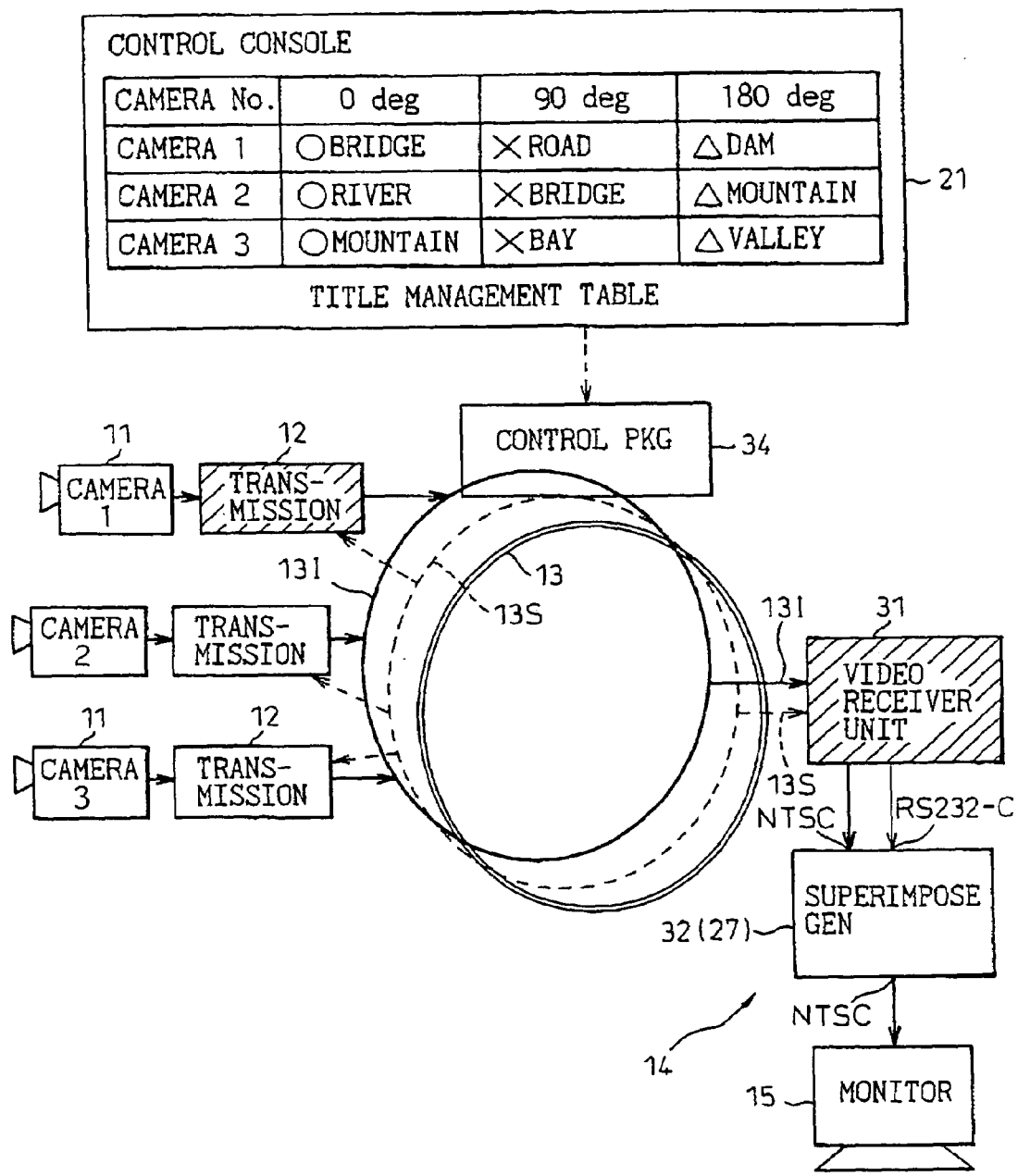
FIG. 15 is a view of the configuration of FIG. 14 shown by a different form of expression.

FIG. 15 is a view of the configuration of FIG. 14 shown by another form of expression. The video receiver unit 31 can also be connected to the switch control path 13S.

Figure 16:
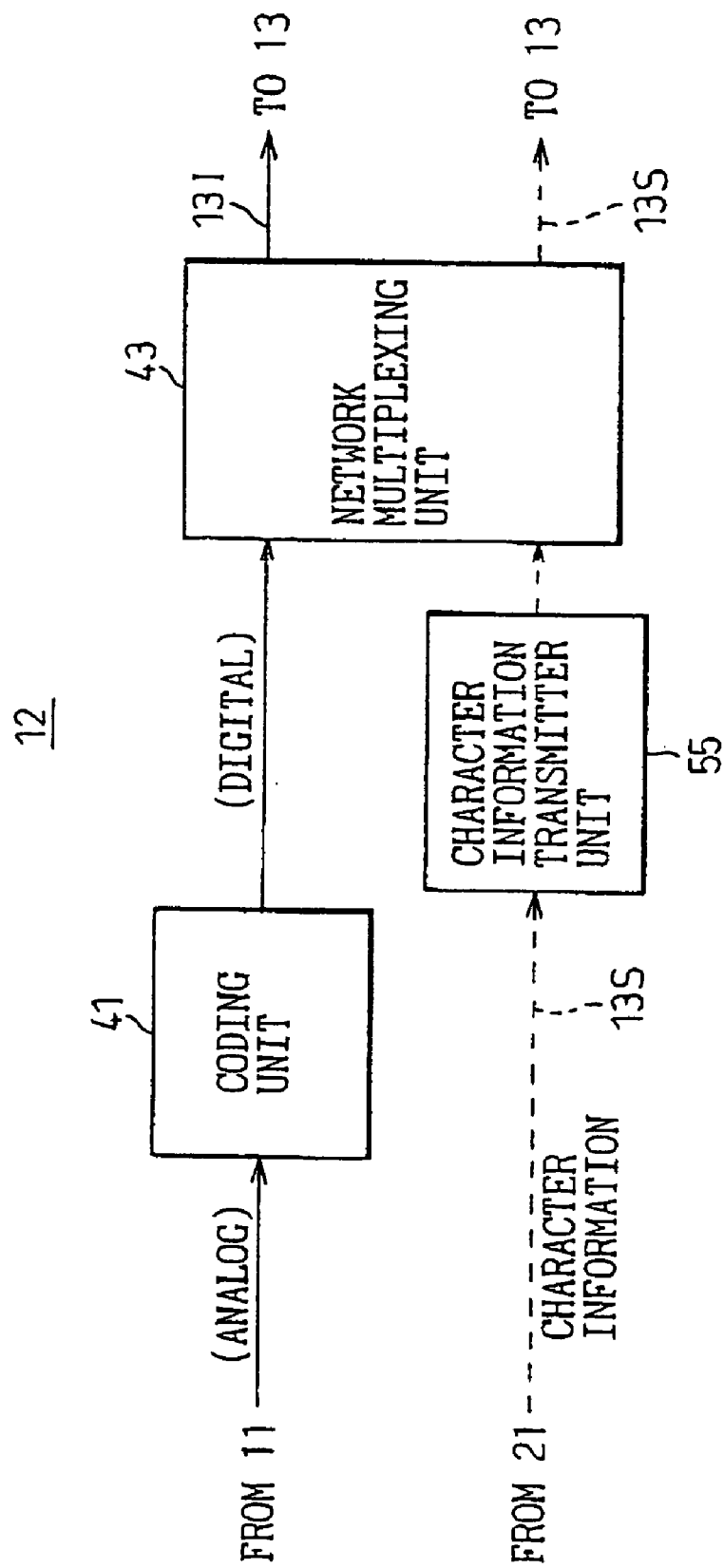
FIG. 16 is a view of a specific example of a video transmission apparatus in the fourth embodiment.

FIG. 16 is a view of a specific example of the video transmission apparatus in the fourth embodiment.

In the video transmission apparatus 12 of this figure, the character information transmitter unit 55 is newly introduced. This receives the character information directly from the switch control path 13S on the network 13, inputs the information to the network multiplexing unit 43 in synchronization so that the switched video information and character information come together, and sends the information through the path 13S to the monitor 15 side.

Figure 17:
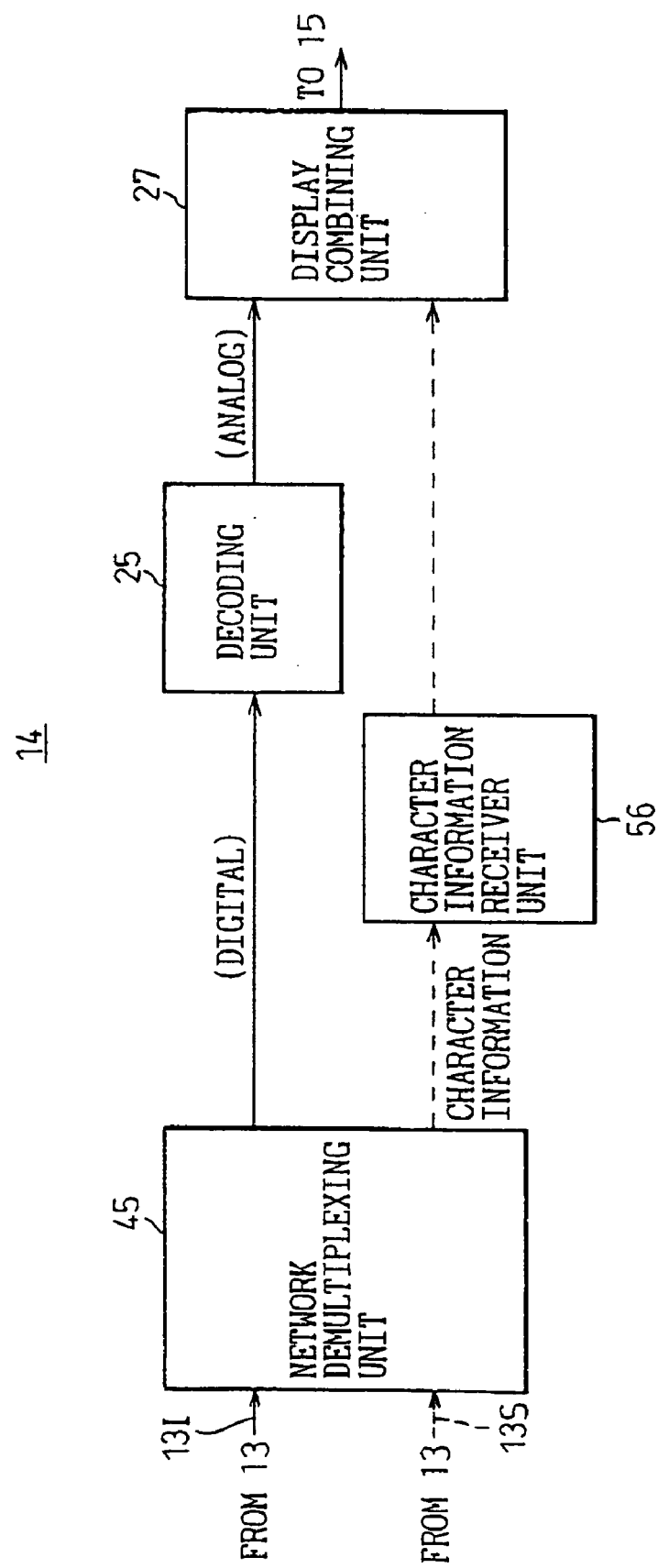
FIG. 17 is a view of a specific example of a video reception apparatus in the fourth embodiment.

FIG. 17 is a view of a specific example of the video reception apparatus in the fourth embodiment.

In the video reception apparatus 14 of this figure, the character information receiver unit 56 is newly introduced. This receives the character information directly from the switch control path 13S on the network 13 and displays it on the monitor 15.

The decoding unit 25 converts the video information received through the video path 131 to analog video information. The display combining unit 27 combines the character information from the character information receiver unit 56 and the video information from the decoding unit 25 and outputs the result to the monitor 15 side.

Next, an explanation will be given of a fifth embodiment of the present invention.

Figure 18:
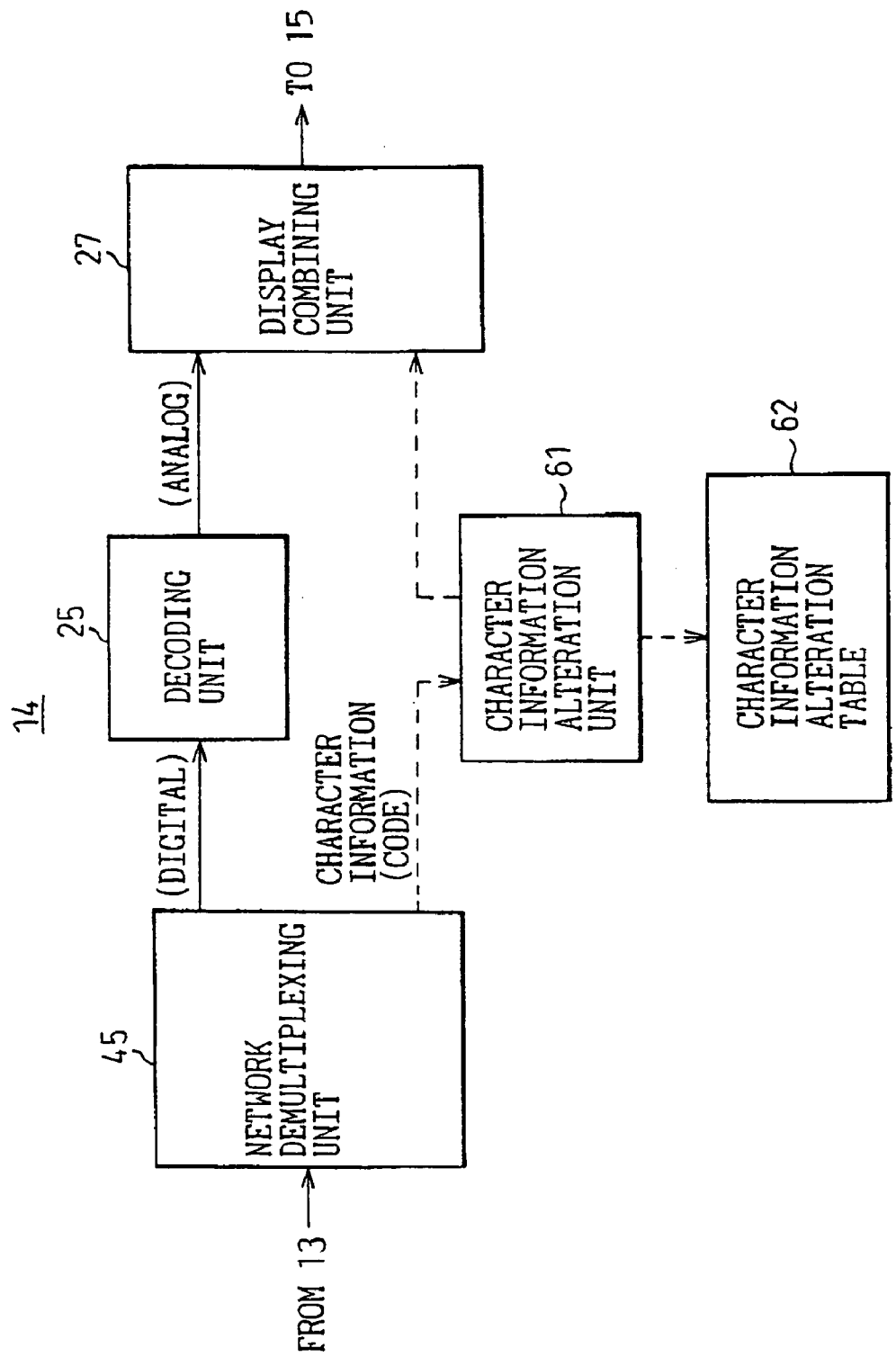
FIG. 18 is a view of a specific example of a video reception apparatus in a fifth embodiment.

FIG. 18 is a view of a video reception apparatus in the fifth embodiment. The video reception apparatus 14 in the fifth embodiment has as its characterizing feature the introduction of the character information alteration unit 61. In this case, the alteration unit 61 refers to a character information alteration table 62.

There are two advantages to the fifth embodiment.

First, there is a limit to the transmission capacity over the network 13 and it is sometimes not possible to transmit large volume character information as it is. In such a case, the character information to be sent from the control console 21 is sent as a code in order to reduce the amount of the data.

Receiving the character information as a code, the video reception apparatus 14 changes it to the original character information corresponding to the received code at the character information alteration unit 61 with reference to the table 62 and inputs the result to the display combining unit 27.

Second, it is possible to simply change to character information defined uniquely at the monitor side. The character information provided from the control console 21 is defined by a local name at the site where the camera is installed. However, at the monitor 15 side (center side), there is a request to display a generally accepted name. In this case, the fifth embodiment is convenient.

Figure 19:
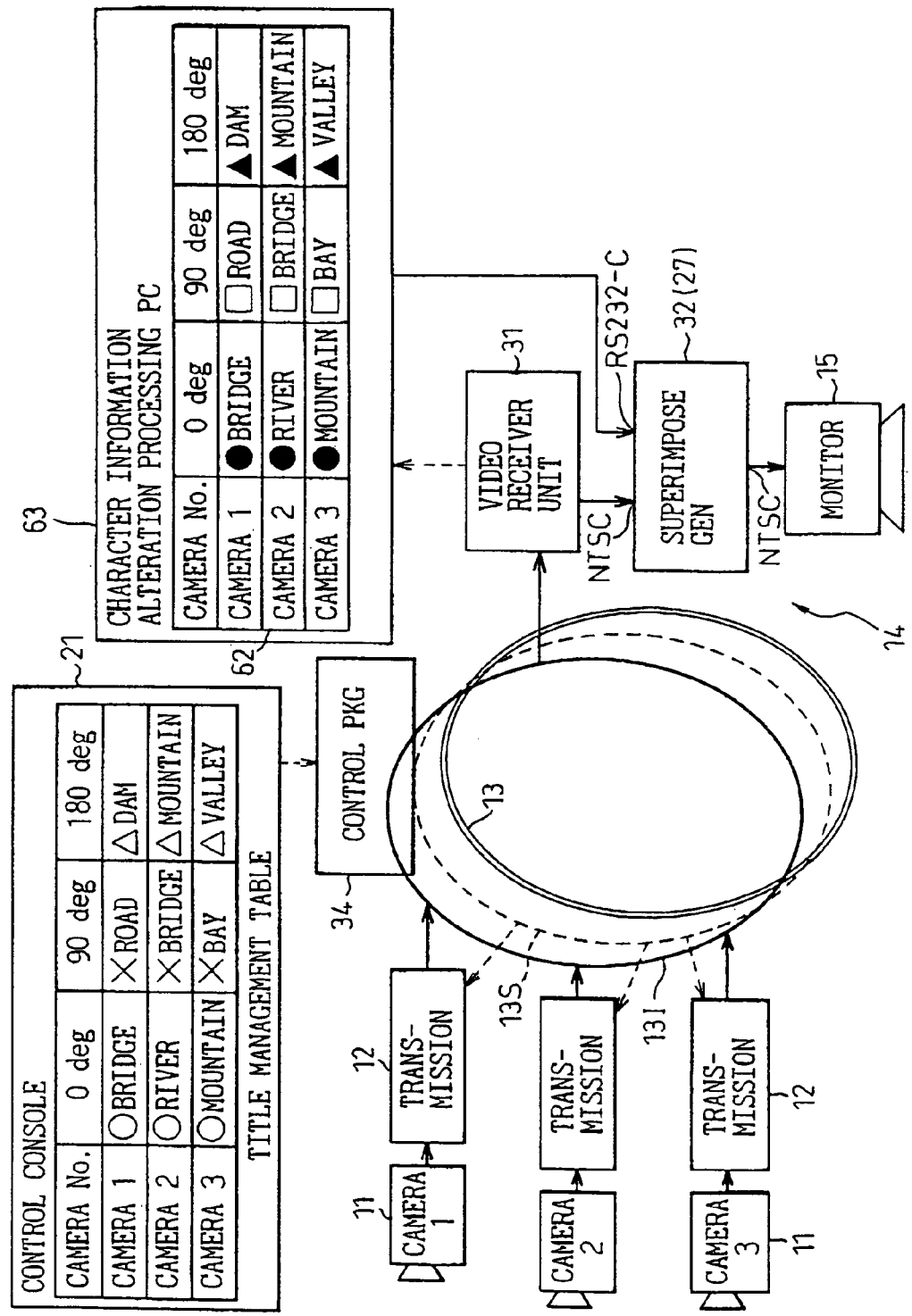
FIG. 19 is a view of the fifth embodiment shown by a different form of expression.

FIG. 19 is a view of the fifth embodiment shown by a different form of expression. This corresponds to the configuration shown in FIG. 4 plus a character information alteration processing personal computer (PC) 63.

Inside the PC 63 is mounted a memory unit forming a character information alteration table 62.

Next, an explanation will be given of a sixth embodiment based on the present invention.

Figure 20:
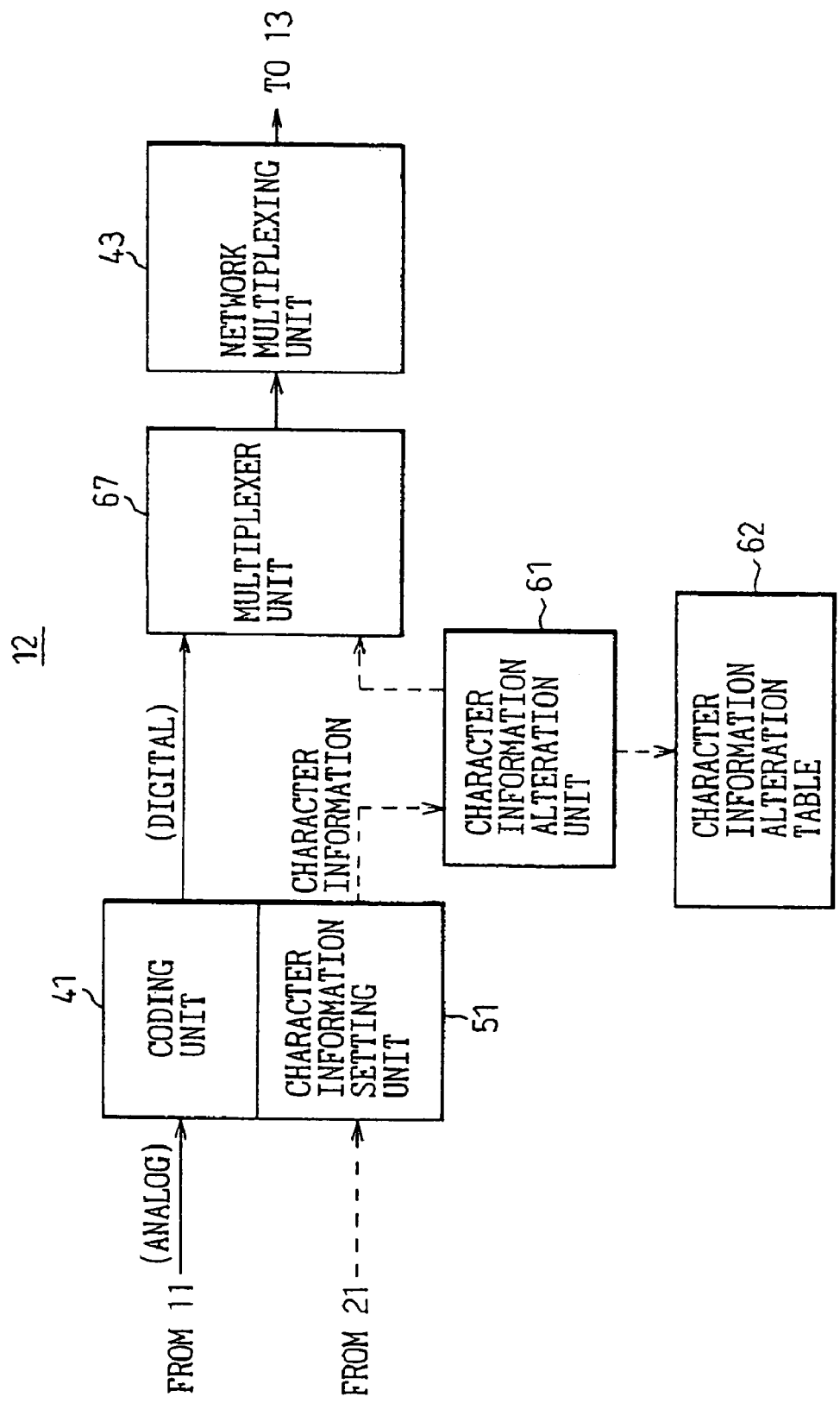
FIG. 20 is a view of a specific example of a video transmission apparatus in a sixth embodiment.

FIG. 20 is a view of a video transmission apparatus in the sixth embodiment. The sixth embodiment provides the character information alteration unit (61) explained in the fifth embodiment and the character information alteration table (62) cooperating with the unit (61) both installed at the camera 11 side. These are shown by reference numerals 61 and 62 in FIG. 20.

The character information altered at the camera 11 side is multiplexed with the video information (digital) from the coding unit 41 in the (digital) multiplexing unit 67 and the result sent to the network 13 side.

Next, an explanation will be given of a seventh embodiment according to the present invention.

Figure 21:
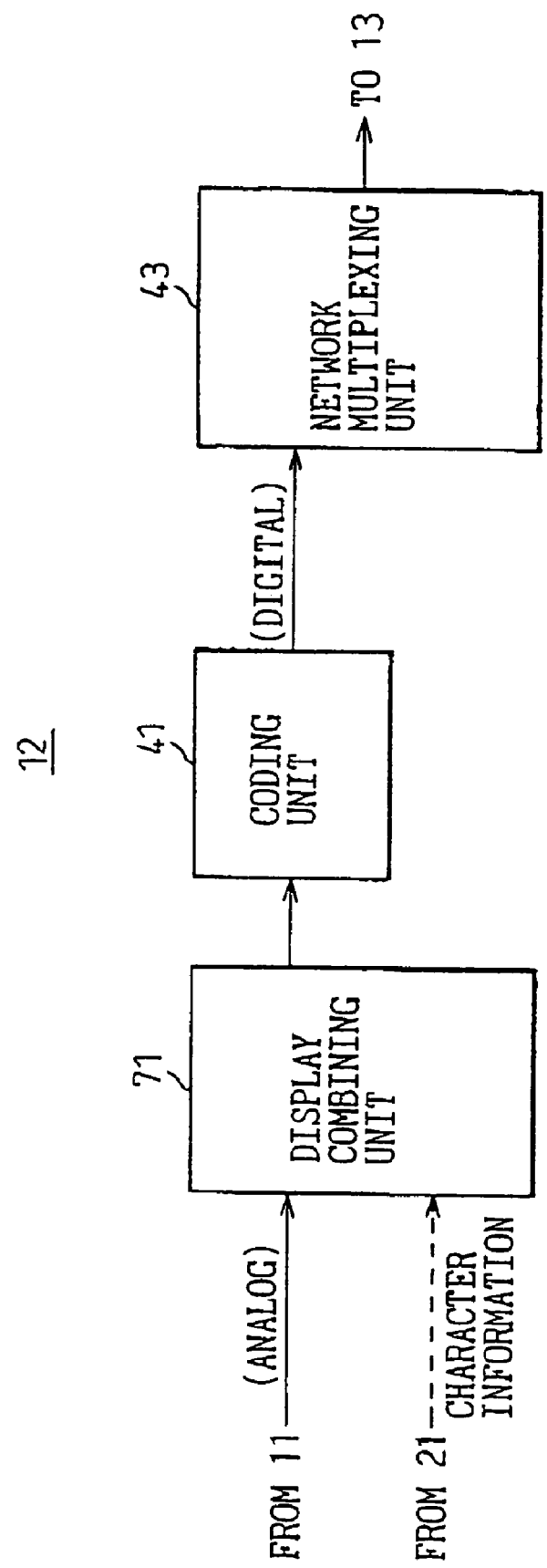
FIG. 21 is a view of a specific example of a video transmission apparatus in a seventh embodiment.

FIG. 21 is a view of a video transmission apparatus in the seventh embodiment.

Figure 22:
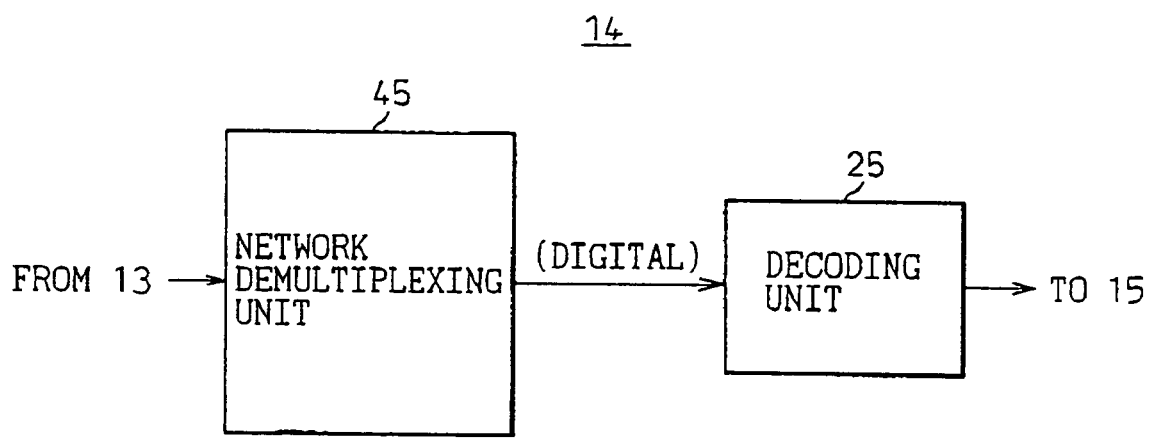
FIG. 22 is a view of a specific example of a video reception apparatus in the seventh embodiment.

FIG. 22 is a view of a video reception apparatus in the seventh embodiment.

The seventh embodiment has as its characterizing feature the provision of the display combining unit (in FIG. 21, shown by 71) at the camera 11 side. Therefore, as shown in the video reception apparatus 14 of FIG. 22, the display combining unit is eliminated from the apparatus 14. The display combining unit 71 of FIG. 21 combines the video information from the camera 11 and the character information by a signal format able to be displayed as it is.

Normally, there are fewer monitors 15 than cameras 11. If a display combining unit breaks down at the monitor 15 side, the video from a large number of cameras can no longer be received. Considering this potential problem, display combining units 71 may also be provided dispersed at the camera 11 side.

Figure 23:
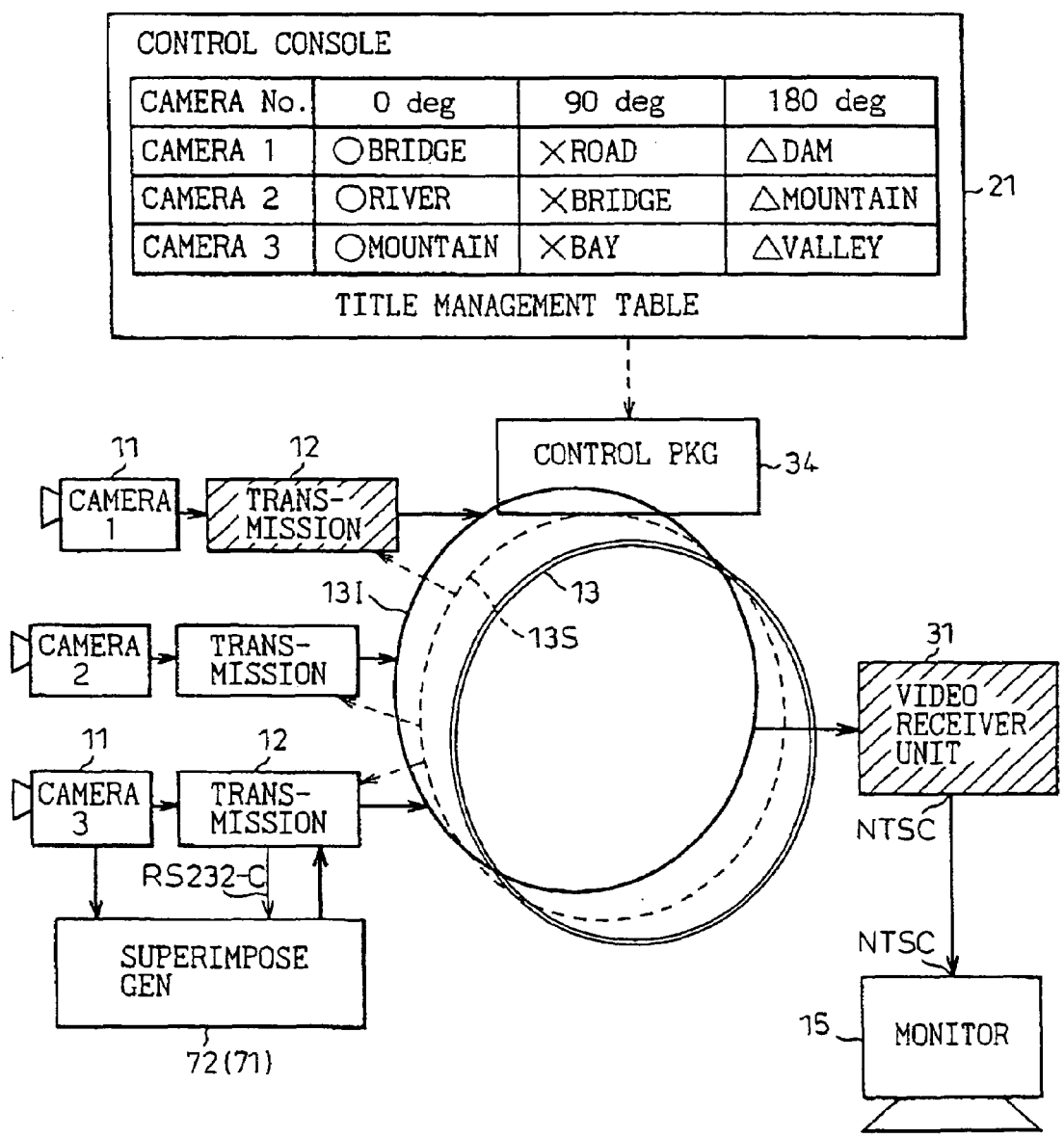
FIG. 23 is a view of the seventh embodiment shown by a different form of expression.

FIG. 23 is a view of the seventh embodiment shown by a different form of expression. The display combining unit 71 of FIG. 21 is comprised by a superimpose generator (GEN).

Finally, an explanation will be given of an eighth embodiment according to the present invention.

Figure 24:
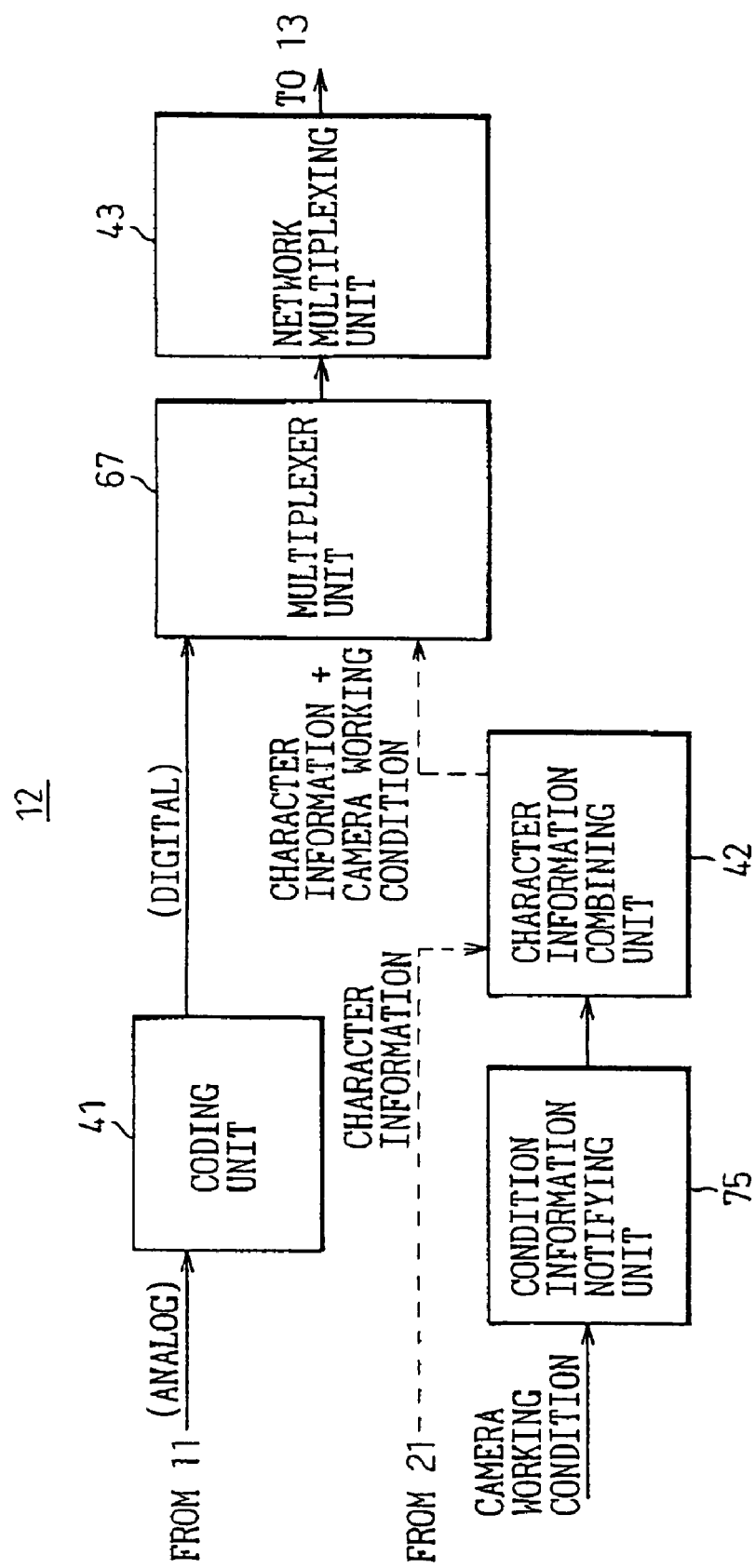
FIG. 24 is a view of a specific example of a video transmission apparatus in an eighth embodiment.

FIG. 24 is a view of a video transmission apparatus in the eighth embodiment. The video transmission apparatus 12 according to the eighth embodiment has as its characterizing feature the provision of a condition information notifying unit 75.

The condition information notifying unit 75 notifies the monitor 15 side of condition information showing the working condition of the camera 11. In this notification, it uses the previously explained character information combining unit 42. There, it can combine this with the character information for transmission.

At the monitor 15 side, it is possible to monitor abnormalities in the working condition of the cameras in addition to character information showing the titles. An abnormality means for example an abnormality in rotation of a camera, a focusing abnormality, or other trouble.

Figure 25:
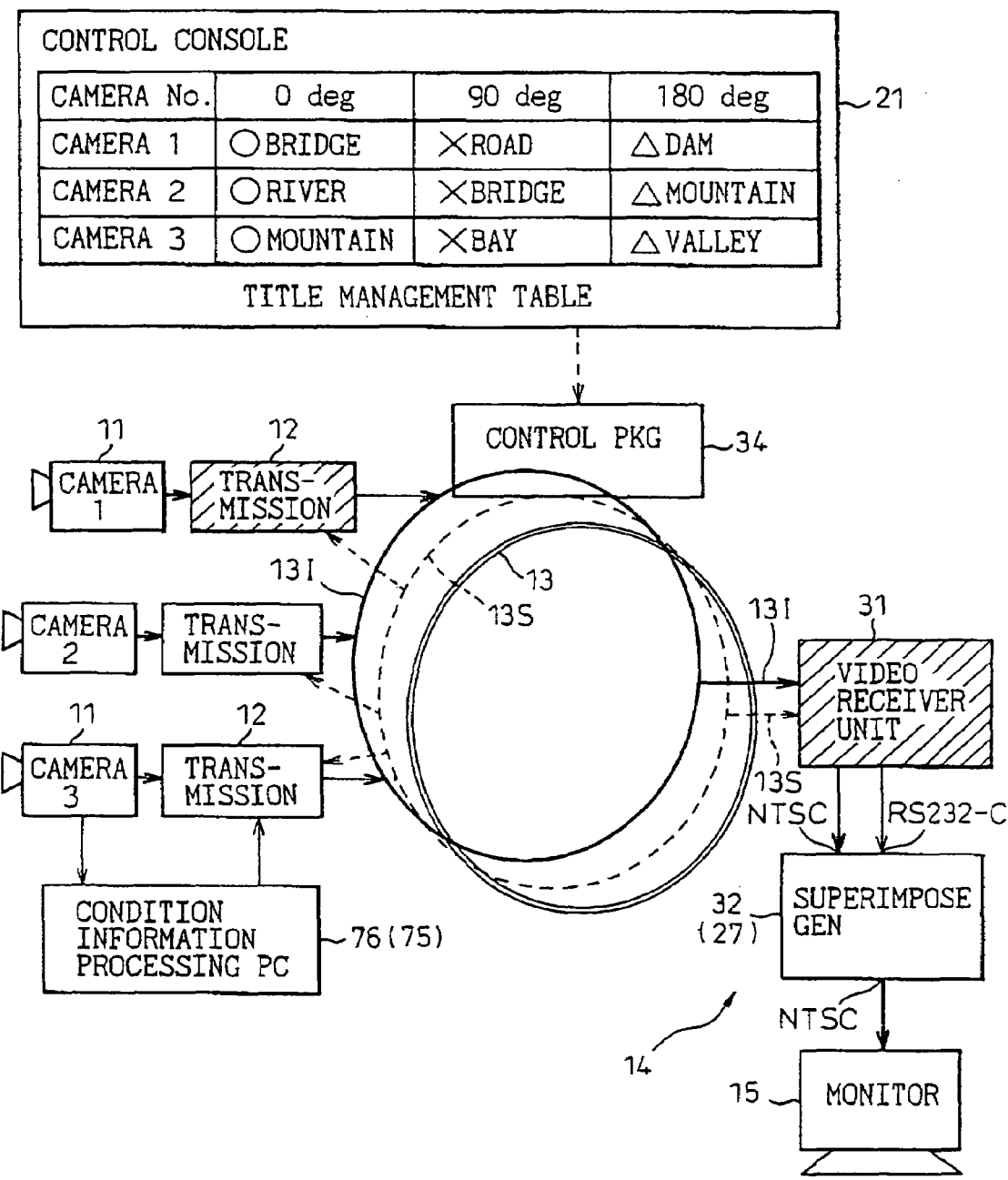
FIG. 25 is a view of the eighth embodiment shown by a different form of expression.

FIG. 25 is a view of the eighth embodiment shown by a different form of expression. In the figure, the condition information notifying unit 75 of FIG. 24 is shown as the condition information notification processing personal computer (PC) 76.

In the above embodiments, the display combining unit 27 (71) constitutes one of the major components. As a specific example, a superimpose generator (GEN) 32 (27) is used. This superimpose generator (GEN) 32 (27) performs the function of superimposing the character information on the video information on the monitor. As a specific product, there is for example the "Kanji Terop Generator" (KTG-1600) made by Hoei Co., Ltd. This receives as input the video signal and character signal and combines the two for output to the monitor.

Detailed examples of the circuit configuration used in the embodiments explained above will be explained below.

Figure 26:
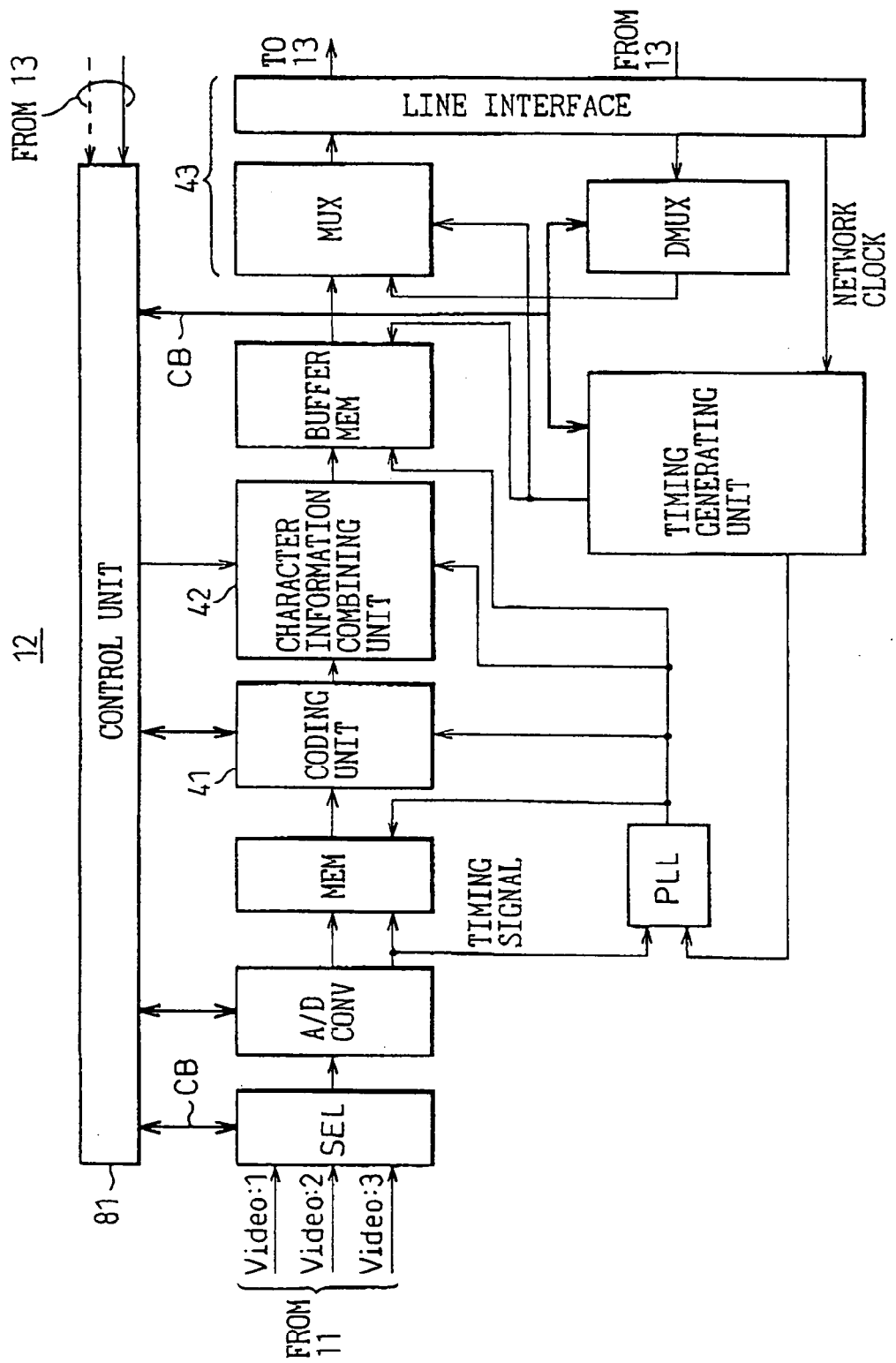
FIG. 26 is a block diagram of a circuit of a detailed example of the video transmission apparatus shown in FIG. 6.

FIG. 26 is a block diagram of a circuit showing a detailed example of the video transmission apparatus shown in FIG. 6. In the figure, portions corresponding to the components of FIG. 6 are shown by the same reference numerals.

The control unit 81 controls the entire video transmission apparatus 12 and is connected through the control buses CB of the two-directional arrow marks to a selector (SEL), A/D converter, coding unit 41, etc.

When there are a plurality of cameras 11, for example, three, the video information (analog) from the cameras 11 are input as Video 1 to Video 3. The desired single video information is selected by the selector (SEL) and converted to digital video information by the A/D converter.

The video information is further, as explained already, processed by the coding unit 41 and the character information combining unit 42 comprised of a multiplexer, stored once in a buffer memory, then sent through the network multiplexing unit 43 to the network 13. Note that the network multiplexing unit 43 includes a demultiplexing unit for processing the signal from the network 13.

The PLL in the figure receives a timing signal of the camera side and a signal from a timing generating unit, synchronizes the two, and distributes the required clock to the memory etc.

Figure 27:
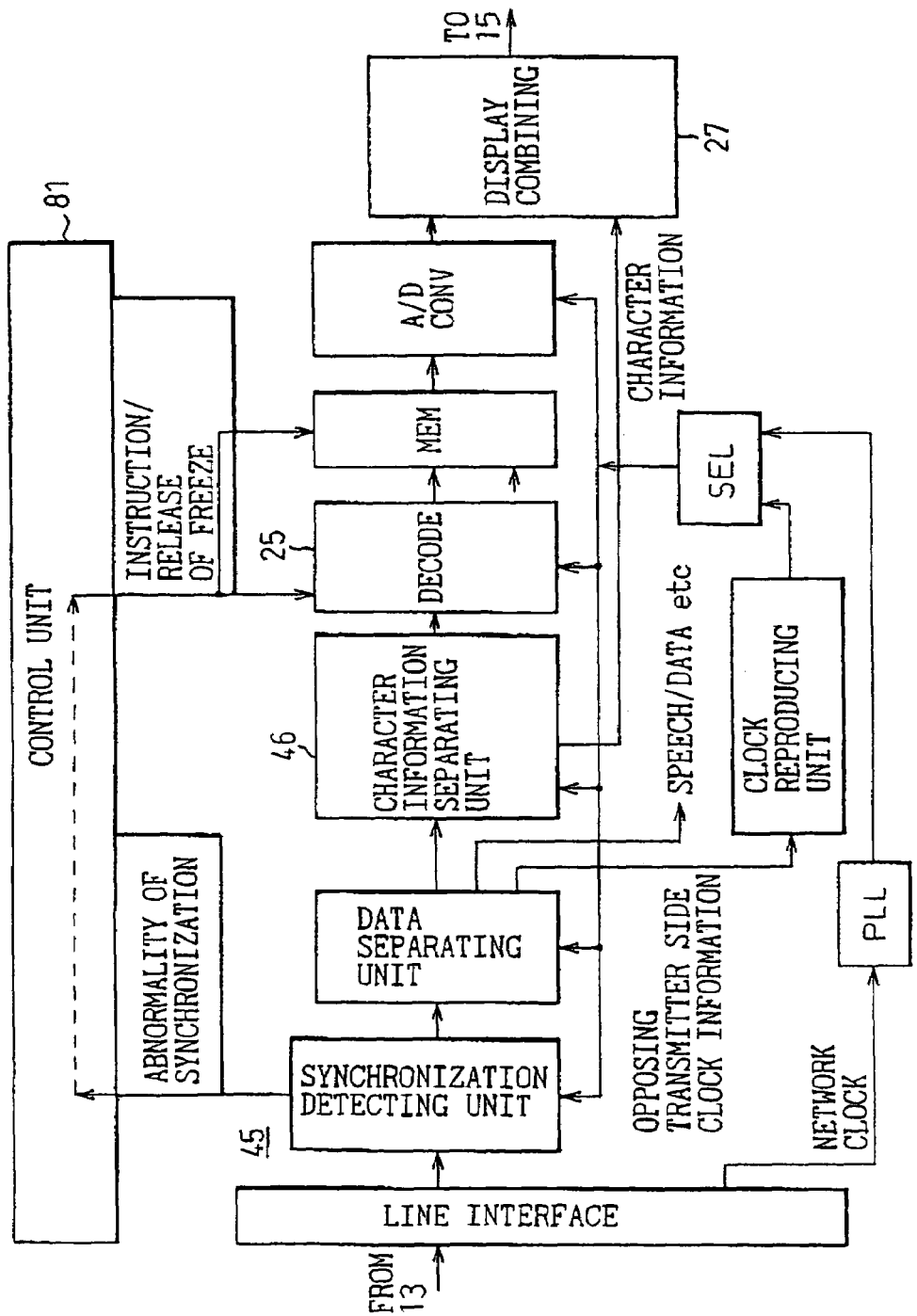
FIG. 27 is a block diagram of a circuit of a detailed example of the video reception apparatus shown in FIG. 7.

FIG. 27 is a block diagram of a circuit showing a detailed example of the video reception apparatus shown in FIG. 7. The components 45, 46, 25, and 27 shown in FIG. 7 are shown in this figure.

The network demultiplexing unit 45 is comprised of a line interface, synchronization detecting unit, and data separating unit.

The character information separated at the character information separating unit 46 is sent out to the display combining unit 27 as it is, while the video information is reproduced as an analog signal at the decoding unit 25, held once at the memory, converted to a digital format at the A/D converter, and input to the display combining unit 27.

When the synchronization detecting unit detects a synchronization abnormality, the control unit 81 instructs the decoding unit 25 and memory to freeze. At this time, the selector SEL switches from the network clock, that is, the output of the PLL, to an internal clock, that is, the output of the clock reproducing unit.

Figure 28:
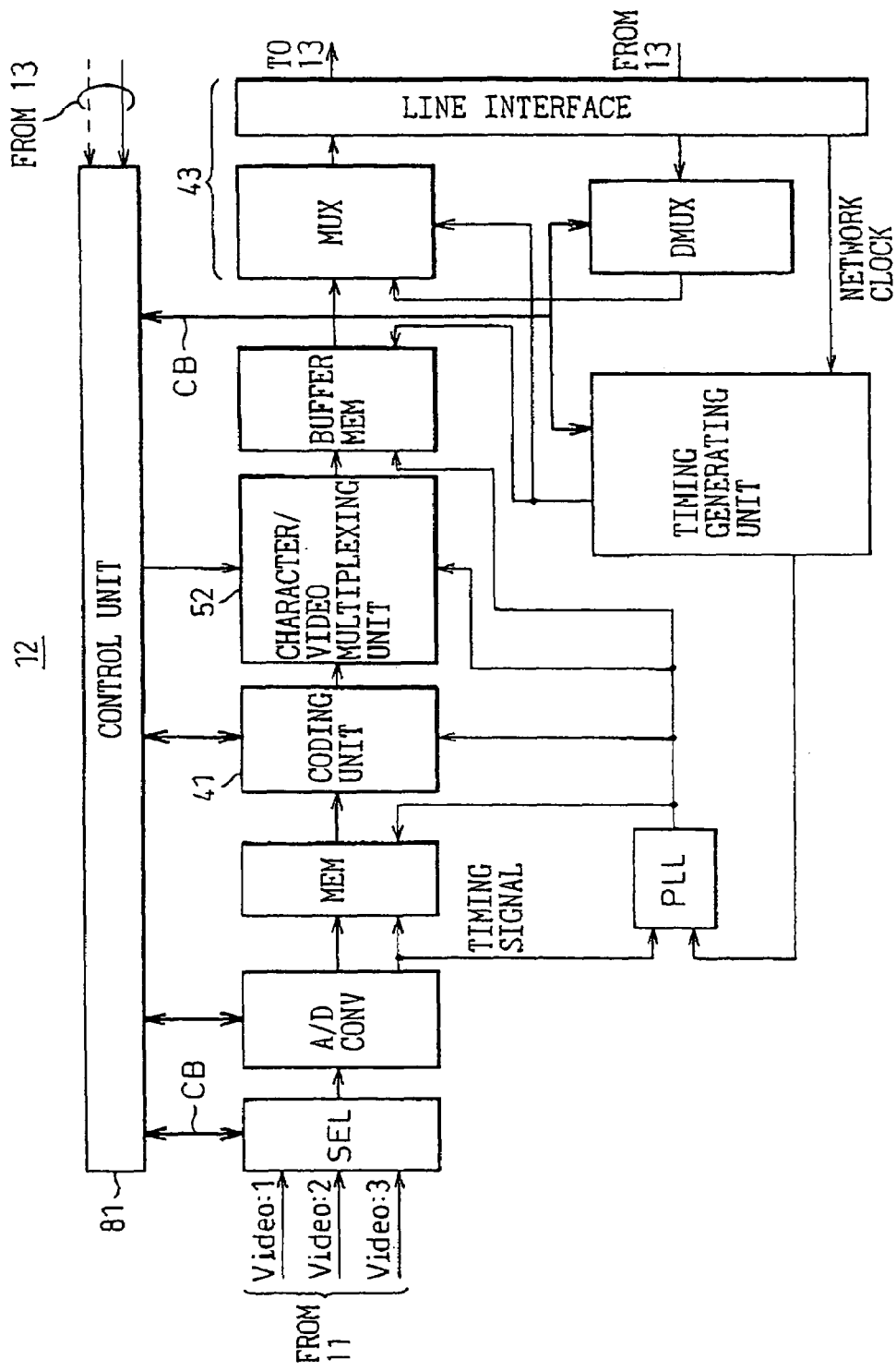
FIG. 28 is a block diagram of a circuit of a detailed example of the video transmission apparatus shown in FIG. 12.

FIG. 28 is a block diagram of a circuit showing a detailed example of the video transmission apparatus shown in FIG. 12. The configuration in this figure is substantially the same as the configuration of the abovementioned FIG. 26. Instead of the character information combining unit 42 of FIG. 26, a character/video multiplexing unit 52 is provided in FIG. 28. The character information received at the control unit 81 from the network 13 is multiplexed at the multiplexing unit 52 with the video information coded at the coding unit 41. At this time, the control unit 81 transfers the above character information to the multiplexing unit 52 in synchronization with the coding of the switched video at the coding unit 41.

Figure 29:
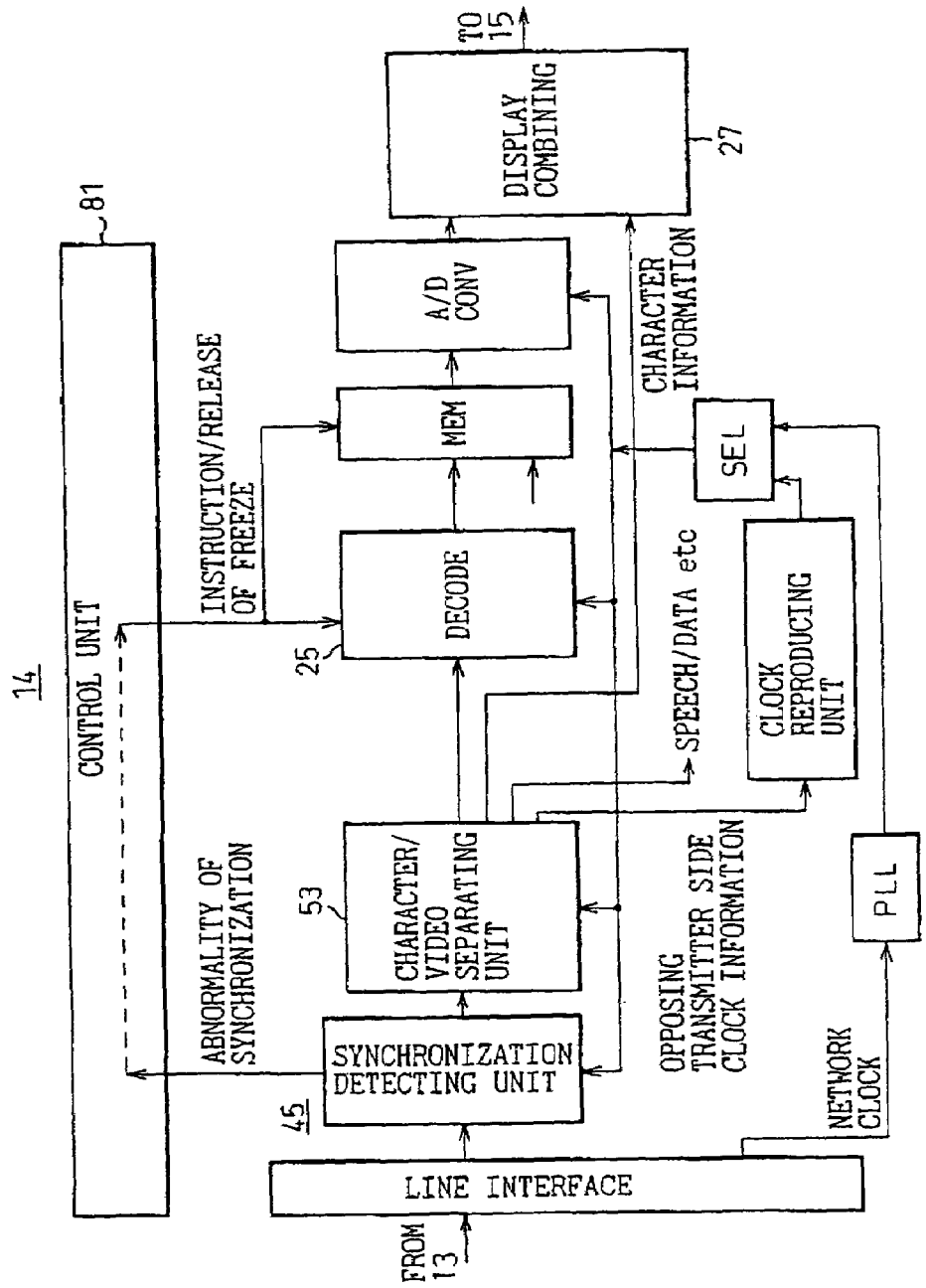
FIG. 29 is a block diagram of a circuit of a detailed example of the video reception apparatus shown in FIG. 13.

FIG. 29 is a block diagram of a circuit showing a detailed example of a video reception apparatus shown in FIG. 13. The components 45, 53, 25, and 27 shown in FIG. 13 are shown in this figure. Among these, the character/video separating unit 53 separates the character information and the video information. The other components are substantially the same as the configuration shown in FIG. 27.

Figure 30:
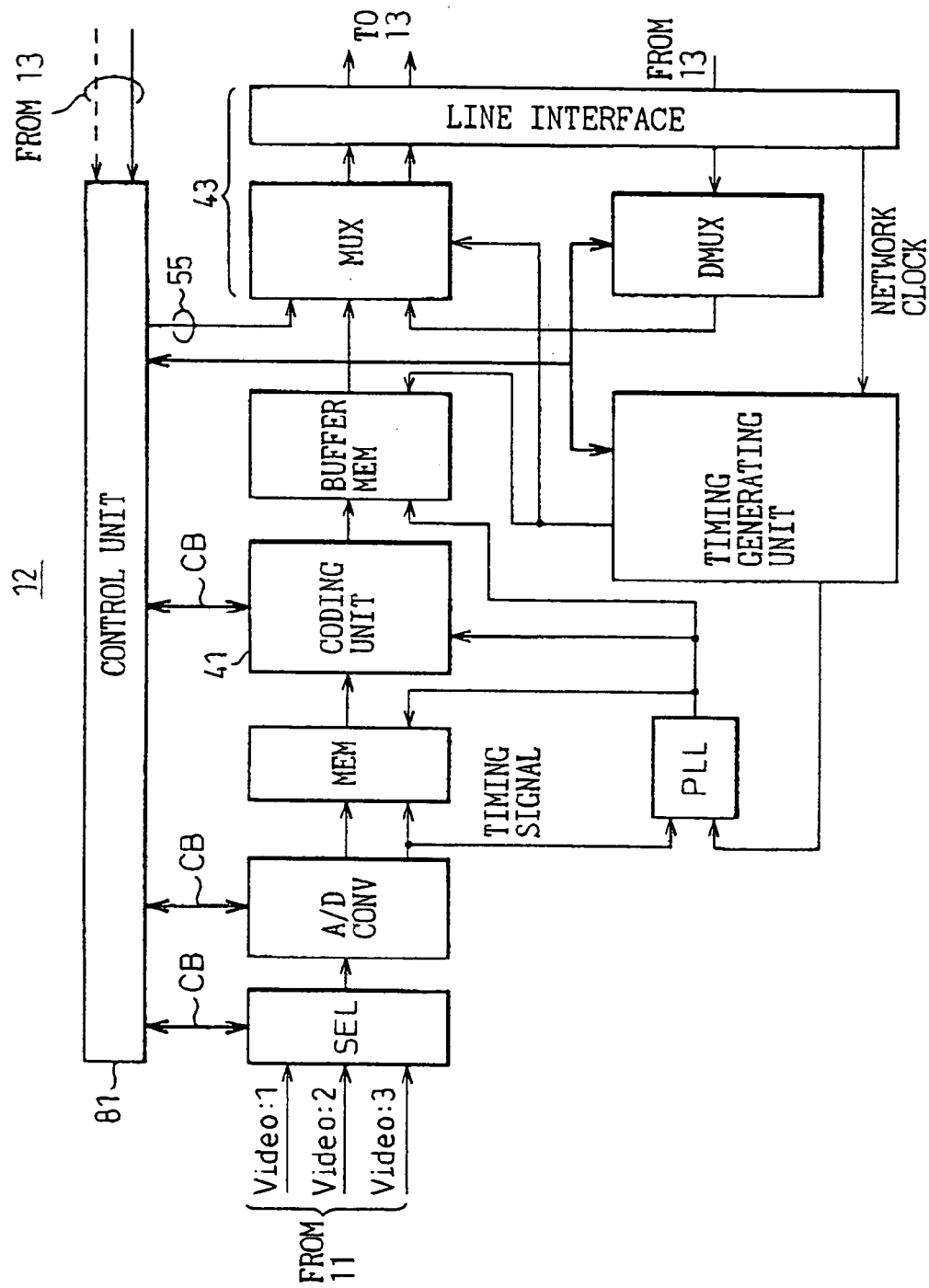
FIG. 30 is a block diagram of a circuit of a detailed example of the video transmission apparatus shown in FIG. 16.

FIG. 30 is a block diagram of a circuit showing a detailed example of a video transmission apparatus shown in FIG. 16. The configuration of this figure is substantially the same as the configuration of FIG. 26 minus the character information combining unit 42 and plus the character information transmitter unit 55. The transmitter unit 55 is shown in FIG. 30 as a simple loopback path to the multiplexing unit. At this time, the control unit 81 adds an identifier to the character information so that the fact of transmission of the character information can be understood at the monitor 15 side.

Further, the switched video is looped back to the multiplexing unit in synchronization with the coding at the coding unit 41.

FIG. 31 is a block diagram of a circuit showing a detailed example of the video reception apparatus shown in FIG. 17. The configuration of this figure is substantially the same as the configuration of FIG. 27 minus the character information separating unit 46 and plus the character information receiver unit 56. The receiver unit 56 is shown in FIG. 31 as a simple data transfer path to the display combining unit 27.

Only the information sent from the camera 11 side (transmitting side) in the character information received from the line interface is output to a serial port P. Next, the video converted from an analog to digital format at the A/D converting unit and its character information are combined at the display combining unit. Therefore, the character information is switched at the same time as switching of the camera.

Summarizing the effects of the present invention, as explained in detail above, according to the present invention, it is possible to record or change or correct the name of the place being shot etc. without having to go to the site where the camera is installed.

Further, when a camera is switched, the name of the place being shot after the switch etc. can be displayed on the monitor substantially simultaneously with the change of the video resulting from the switch and no strange feeling is given to the operator viewing the monitor.

Further, it is possible to display on the monitor even information on abnormalities occurring at the camera side in real time.

While the invention has been described with reference to specific embodiment chosen for purpose of illustration, it should be apparent that numerous modifications could be made thereto by those skilled in the art without departing from the basic concept and scope of the invention.

What is claimed is:

1. A video telecommunication system comprising:
    a plurality of video transmission apparatuses, each of which is provided with a camera,
    a video reception apparatus placed in a single supervisory center and provided with a monitor for receiving and displaying video information sent from each of the plurality of cameras, and
    a network over which each of the plurality of video transmission apparatuses is connected to the video reception apparatus, wherein said video telecommunication system further comprises
    a video information describing unit having a title management table storing titles representing video information given by said plurality of cameras, and sending both a switch command for specifying one of the plurality of cameras and character information describing video information from the specified camera simultaneously, so as to make the monitor display the video information combined with the character information.

2. A video telecommunication system as set forth in claim 1, wherein said video information describing unit sends said switch command via the network to the plurality of video transmission apparatuses and sends the character information via a control line to the video reception apparatus.

3. A video telecommunication system as set forth in claim 1, wherein the video information describing unit sends both the switch command and the character information via the network to the plurality of video transmission apparatuses which extracts the character information therefrom and multiplexes the extracted character information and the video information sends the same to the video reception apparatus.

4. A plurality of video transmission apparatuses used in a video telecommunication system, wherein each of the plurality of video transmission apparatuses is provided with a camera and the video telecommunication system further includes a video reception apparatus placed in a single supervisory center and provided with a monitor for receiving and displaying video information sent from each camera, and a network over which each of the plurality of video transmission apparatuses is connected to the video reception apparatus, each video transmission apparatus further comprising:
    a character information combining unit for receiving both a switch command and character information from a video information describing unit having a title management table storing titles representing video information given by said plurality of cameras, said video information describing unit sending both the switch command for specifying one of the plurality of cameras and character information describing the video information from the specified camera simultaneously, so as to make the monitor display the video information combined with the character information, and for combining the character information with the video information of the camera and outputting the result to the monitor side.

5. A video transmission apparatus as set forth in claim 4, wherein said character information combining unit inserts the combined video information and character information together in a data frame and outputs the result to the monitor side.

6. A video transmission apparatus as set forth in claim 5, wherein the data frame is a data frame formed based on the MPEG and holds the video information and character information in a user data region of the data frame.

7. A video transmission apparatus as set forth in claim 5, wherein the data frame is a data frame formed based on the MPEG and holds the character information in a private data region of the data frame.

8. A video transmission apparatus as set forth in claim 4, further comprising a character information alteration unit for altering the character information received from the video information describing unit to character information unique to the camera side.

9. A video transmission apparatus as set forth in claim 4, further comprising a condition notifying unit for notifying the monitor side of condition information expressing the working condition of each camera.

10. A video transmission apparatus as set forth in claim 9, wherein the information from the condition notifying unit is input to the character information combining unit.

11. A plurality of video transmission apparatuses used in a video telecommunication system, wherein each of the plurality of video transmission apparatuses is provided with a camera, and the video telecommunication system further includes a video reception apparatus placed in a single supervisory center and provided with a monitor for receiving and displaying video information sent from each camera, and a network over which each of the plurality of video transmission apparatuses is connected to the video reception apparatus, each video transmission apparatus further comprising:
    a video/character information multiplexing unit for receiving a switch command and its character information from a video information describing unit having a title management table storing titles representing video information given by said plurality of cameras, said video information describing unit sending both the switch command for specifying one of the plurality of cameras and character information describing the video information from the specified camera simultaneously, so as to make the monitor display the video information combined with the character information, and for multiplexing the character information extracted from there with the video information of the camera and outputting the result to the monitor side and
    a character information setting unit for inputting the character information to the video/character information multiplexing unit in synchronization so that the switched video information and character information come together.

12. A plurality of video transmission apparatuses used in a video telecommunication system wherein each of the plurality of video transmission apparatuses is provided with a camera and the video telecommunication system further includes a video reception apparatus placed in a single supervisory center and provided with a monitor for receiving and displaying video information sent from each camera, and a network over which each of the plurality of video transmission apparatuses is connected to the video reception apparatus, each video transmission apparatus further comprising:

a character information transmitting unit for receiving through a video path and switch control path on the network a switch command and character information from a video information describing unit having a title management table storing titles representing video information given by said plurality of cameras, said video information describing unit sending both the switch command for specifying one of the plurality of cameras and character information describing the video information from the specified camera simultaneously, so as to make the monitor display the video information combined with the character information, and for outputting the character information extracted from the switch control path, separate from the video information of the camera, through the switch control path, to the monitor side.

13. A plurality of video transmission apparatuses used in a video telecommunication system wherein each of the plurality of video transmission apparatuses is provided with a camera and the video telecommunication system further includes a video reception apparatus placed in a single supervisory center and provided with a monitor for receiving and displaying video information sent from each camera, and a network over which each of the plurality of video transmission apparatuses is connected to the video reception apparatus, each video transmission apparatus further comprising:

a display combining unit for receiving a switch command and character information from a video information describing unit having a title management table storing titles representing video information given by said plurality of cameras, said video information describing unit sending both the switch command for specifying one of the plurality of cameras and character information describing the video information from the specified camera simultaneously, so as to make the monitor display the video information combine with the character information, and for combining the character information extracted from there with the video information of the specified camera by a signal format able to be displayed as it is on the monitor.

14. A video transmission apparatus as set forth in claim 13, wherein the display combining unit is comprised of a superimpose generator.

15. A video reception apparatus used in a video telecommunication system including a plurality of video transmission apparatuses each of which is provided with a camera, the video reception apparatus being placed in a single supervisory center and provided with a monitor for receiving and displaying video information sent from each camera, and a network over which each of the plurality of video transmission apparatuses is connected to the video reception apparatus, the video reception apparatus further comprising:

a decoding unit for converting video information sent from the plurality of cameras to analog video information, a character information converting unit for receiving a switch command from a video information describing unit which has a title management table storing titles representing video information given by said cameras, and sends both the switch command for specifying one of the plurality of cameras and character information describing the video information from the specified camera simultaneously, so as to make the monitor display the video information combined with the character information, and for converting a digital code forming the character information to analog character information, and a display combining unit for combining the character information from the character information converting unit with the video information from the decoding unit and outputting the result to the monitor.

16. A video reception apparatus as set forth in claim 15, wherein the display combining unit is comprised of a superimpose generator.

17. A video reception apparatus used in a video telecommunication system including a plurality of video transmission apparatuses each of which is provided with a camera the video reception apparatus being placed in a single supervisory center and provided with a monitor for receiving and displaying video information sent from each camera, and a network over which each of the plurality of video transmission apparatuses is connected to the video reception apparatus, the video reception apparatus further comprising:

a character information separating unit for receiving once at the camera side character information from a video information describing unit which has a title management table storing titles representing video information given by said cameras, and sends both a switch command for specifying one of the plurality of camera and character information describing the video information from the specified camera simultaneously, so as to make the monitor display the video information combined with the character information, and for receiving the character information together with the video information of the camera side, then separating it and a decoding unit for converting the received video information to analog video information and combining the character information from the character information separating unit with the video information from the decoding unit and outputting the result to the monitor.

18. A video reception apparatus as set forth in claim 17, further comprising a character information alteration unit for altering the received character information to character information unique to the monitor side.

19. A plurality of video transmission apparatuses used in a video telecommunication system wherein each of the plurality of video transmission apparatuses is provided with a camera and the video telecommunication system further includes a video reception apparatus placed in a single supervisory center and provided with a monitor for receiving and displaying video information sent from each camera, and a network over which each of the plurality of video transmission apparatuses is connected to the video reception apparatus, each video transmission apparatus further comprising:

a character/video separating unit for receiving once at the camera side character information from a video information describing unit has a title management table storing titles representing video information given by said cameras, and which sends both a switch command for specifying one of the plurality of camera and character information describing the video information from the specified camera simultaneously, so as to make the monitor display the video information combined with the character information, and for receiving the video information and the character information from the camera side, then separating the character information, a decoding unit for converting video information from the character/video separating unit to analog video information, and a display combining unit for combining the character information from the character/video separating unit with the video information from the decoding unit and outputting the result to the monitor.

20. A video reception apparatus as set forth in claim 19, wherein the display combining unit is comprised of a superimpose generator.

21. A video reception apparatus as set forth in claim 19, further comprising a character information alteration unit for altering the received character information to character information unique to the monitor side.

22. A plurality of video transmission apparatuses used in a video telecommunication system wherein each of the plurality of video transmission apparatuses is provided with a camera and the video telecommunication system further includes a video reception apparatus placed in a single supervisory center and provided with a monitor for receiving and displaying video information sent from each camera, and a network over which each of the plurality of video transmission apparatuses is connected to the video reception apparatus, each video transmission apparatus further comprising:

a character information receiver unit for receiving, through a switch control path on the network, character information from a video information describing unit has a title management table storing titles representing video information given by said cameras, and which sends both a switch command for specifying one of the plurality of cameras and character information describing the video information from the specified camera simultaneously, so as to make the monitor display the video information combined with the character information, a decoding unit for converting the video information received through the video path on the network to analog video information, and a display combining unit for combining the character information from the character information receiver unit with the video information from the decoding unit and outputting the result to the monitor.

* * * * *